US010073729B2

(12) United States Patent
Liu et al.

(10) Patent No.: US 10,073,729 B2
(45) Date of Patent: Sep. 11, 2018

(54) FAULT MANAGEMENT METHOD, ENTITY, AND SYSTEM

(71) Applicant: Huawei Technologies Co., Ltd., Shenzhen (CN)

(72) Inventors: Jianning Liu, Beijing (CN); Lei Zhu, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 15/084,548

(22) Filed: Mar. 30, 2016

(65) Prior Publication Data
US 2016/0224409 A1    Aug. 4, 2016

Related U.S. Application Data

(63) Continuation of application No. PCT/CN2013/084686, filed on Sep. 30, 2013.

(51) Int. Cl.
*G06F 11/00*         (2006.01)
*G06F 11/07*         (2006.01)
(Continued)

(52) U.S. Cl.
CPC ...... *G06F 11/0793* (2013.01); *G06F 9/45558* (2013.01); *G06F 11/079* (2013.01);
(Continued)

(58) Field of Classification Search
CPC ............ G06F 11/0709; G06F 11/0712; G06F 11/0751; G06F 11/0766; G06F 11/0775;
(Continued)

(56) References Cited

U.S. PATENT DOCUMENTS 8,006,134 B2 *  8/2011  Nammatsu .......... G06F 11/0709
                                                    714/26
8,195,985 B2 *  6/2012  Nakamura .......... G06F 11/0709
                                                    714/43
(Continued)

FOREIGN PATENT DOCUMENTS

CN        102394774 A        3/2012
CN        102523257 A        6/2012
(Continued)

OTHER PUBLICATIONS

Chiosi et al., "Network Functions Virtualisation—An Introduction, Benefits, Enablers, Challenges & Call for Action," Network Functions Virtualisation—Introductory White Paper, Oct. 22-24, 2012, 16 pages, Issue 1.
(Continued)

*Primary Examiner* — Marc M Duncan
(74) *Attorney, Agent, or Firm* — Slater Matsil, LLP

(57) ABSTRACT

Embodiments provide a fault management method, which can implement fault reporting and processing in an NFV environment. The method includes acquiring first fault information, including a faulty entity identifier and a fault type, of a network functions virtualization infrastructure NFVI entity, where the first fault information is used to indicate that a fault occurs in a first NFVI entity having the faulty entity identifier. The method also includes generating first comprehensive fault information according to the first fault information, where the first comprehensive fault information comprises the first fault information and correlated fault information of the first fault information. The method also includes performing fault repair or reporting processing according to the first comprehensive fault information.

12 Claims, 10 Drawing Sheets

(51) Int. Cl.
*H04L 12/24* (2006.01)
*G06F 9/455* (2018.01)
*H04L 29/08* (2006.01)

(52) U.S. Cl.
CPC ...... *G06F 11/0709* (2013.01); *G06F 11/0712* (2013.01); *G06F 11/0751* (2013.01); *G06F 11/0772* (2013.01); *H04L 41/069* (2013.01); *H04L 41/0654* (2013.01); *H04L 41/0677* (2013.01); *H04L 41/0686* (2013.01); *H04L 67/10* (2013.01); *G06F 2009/45595* (2013.01); *H04L 41/065* (2013.01); *H04L 41/0893* (2013.01)

(58) Field of Classification Search
CPC ............. G06F 11/0778; G06F 11/0772; G06F 11/079; G06F 11/0793; G06F 9/45558; G06F 2009/45595; H04L 41/0631; H04L 41/0654; H04L 41/0677; H04L 41/0689; H04L 41/069; H04L 41/065; H04L 67/10
See application file for complete search history.

(56) References Cited

U.S. PATENT DOCUMENTS

| | | | | |
|---|---|---|---|---|
| 9,594,620 | B2* | 3/2017 | Xia | G06F 11/004 |
| 9,690,683 | B2* | 6/2017 | Skerry | H04L 41/0816 |
| 2005/0172162 | A1* | 8/2005 | Takahashi | G06F 11/0709 |
| | | | | 714/4.4 |
| 2008/0082975 | A1 | 4/2008 | Oney et al. | |
| 2009/0303884 | A1 | 12/2009 | Kimura et al. | |
| 2010/0103823 | A1* | 4/2010 | Goerge | H04L 41/044 |
| | | | | 370/242 |
| 2010/0332889 | A1 | 12/2010 | Shneorson et al. | |
| 2011/0022882 | A1* | 1/2011 | Jaehde | G06F 11/2023 |
| | | | | 714/4.1 |
| 2011/0154091 | A1* | 6/2011 | Walton | G06F 11/0712 |
| | | | | 714/2 |
| 2012/0011397 | A1 | 1/2012 | Murakami et al. | |
| 2014/0006862 | A1* | 1/2014 | Jain | G06F 11/0736 |
| | | | | 714/26 |
| 2014/0201374 | A1* | 7/2014 | Ashwood-Smith | H04L 49/70 |
| | | | | 709/226 |
| 2014/0317261 | A1* | 10/2014 | Shatzkamer | G06F 9/455 |
| | | | | 709/223 |
| 2016/0203064 | A1* | 7/2016 | Ren | G06F 11/08 |
| | | | | 714/4.12 |

FOREIGN PATENT DOCUMENTS

| | | |
|---|---|---|
| CN | 103037019 A | 4/2013 |
| JP | 2009294972 A | 12/2009 |
| JP | 2012018453 A | 1/2012 |
| KR | 100805820 B1 | 2/2008 |
| RU | 2429530 C2 | 9/2011 |
| WO | 2006057588 A1 | 6/2006 |

OTHER PUBLICATIONS

ETSI: "Network Function Virtualization (NFV) Managemnt and Orchestration," Group Specification, GS NFV-MAN 001, V0.0.5, Sep. 17, 2013, 47 pages, France.

ETSI: "Network Functions Virtualisation (NFV); Architectural Framework," Group Specification, GS NFV-0010, V0.1.8, Sep. 24, 2013, 24 pages, France.

ETSI: "Network Function Virtualization (NFV); Management and Orchestration," Group Specification, Apr. 17, 2013, 18 pages, France.

King, D., et al., "A Critical Survey of Network Functions Virtualization," 9th International Conference on IP+ Optical Network (iPOP 2013), Tokyo, Japan, May 2013, 24 pages.

Huawei Technologies (UK), "E2E Architecture-Figure 4: Clarification on VNFM," ETSI NFV(13)M0303r1, Jul. 22, 2013, 2 pages.

Intel Corporation, "RELA_E2EArch_Recommendations_And_Clarifications," ETSI NFVREL(13)28_002, Aug. 31, 2013, 3 pages.

* cited by examiner

FAULT MANAGEMENT METHOD, ENTITY, AND SYSTEM

This application is a continuation of International Patent Application No. PCT/CN2013/084686, filed on Sep. 30, 2013, which is hereby incorporated by reference in its entirety.

TECHNICAL FIELD

The present application relates to the communications field, and in particular, to a fault management method, an entity, and a system.

BACKGROUND

Network function virtualization (NFV) is intended to implement software of some network functions by using a general high-performance large-capacity server, switch, and storage device. Compared with an original common virtual environment, in an NFV end to end (E2E) architecture, many software instances and management entities are added, such as a virtualized network functions (VNF) instance/entity, a virtualized infrastructure manager (VIM) entity, and a VNF manager entity, so that an NFV environment is more complex than the common virtual environment. A fault reporting and processing method in the common virtual environment cannot be applied to the NFV environment. Therefore, how to perform fault reporting and processing in a complex NFV environment needs to be considered.

SUMMARY

Embodiments provide a fault management method, which can implement fault reporting and processing in an NFV environment.

According to a first aspect, a fault management method is provided. The method includes acquiring, by a virtualized infrastructure manager (VIM), first fault information, including a faulty entity identifier and a fault type, of a network functions virtualization infrastructure (NFVI) entity, where the first fault information is used to indicate that a fault occurs in a first NFVI entity having the faulty entity identifier; generating, by the VIM, first comprehensive fault information according to the first fault information, where the first comprehensive fault information includes the first fault information and correlated fault information of the first fault information. The method also includes performing, by the VIM, fault repair or reporting processing according to the first comprehensive fault information.

According to a second aspect, a fault management method is provided. The method includes acquiring, by a virtualized network function manager (VNFM), second fault information, including a faulty entity identifier and a fault type, of a virtualized network function (VNF) entity, where the second fault information is used to indicate that a fault occurs in a first VNF entity having the faulty entity identifier. The method also includes generating, by the VNFM, second comprehensive fault information according to the second fault information; and performing, by the VNFM, fault repair or reporting processing according to the second comprehensive fault information.

According to a third aspect, a fault management method is provided. The method includes receiving, by an orchestrator, first comprehensive fault information sent by a virtualized infrastructure manager (VIM), where the first comprehensive fault information includes first fault information, the first fault information includes a faulty entity identifier and a fault type, and the first fault information is used to indicate that a fault occurs in a first network function virtualization infrastructure (NFVI) entity having the faulty entity identifier. The method also includes performing, by the orchestrator, fault repair or reporting processing according to the first comprehensive fault information.

According to a fourth aspect, a fault management method is provided. The method includes receiving, by an orchestrator, second comprehensive fault information sent by a virtualized network function manager (VNFM), where the second comprehensive fault information includes second fault information, the second fault information includes a faulty entity identifier and a fault type, and the second fault information is used to indicate that a fault occurs in a first virtualized network function (VNF) entity having the faulty entity identifier. The method also includes performing, by the orchestrator, fault repair or reporting processing according to the second comprehensive fault information.

According to a fifth aspect, a virtualized infrastructure manager is provided. The virtualized infrastructure manager includes an acquiring unit, configured to acquire first fault information, including a faulty entity identifier and a fault type, of a network function virtualization infrastructure (NFVI) entity, where the first fault information is used to indicate that a fault occurs in a first NFVI entity having the faulty entity identifier. The virtualized infrastructure manager also includes a generating unit, configured to generate first comprehensive fault information according to the first fault information, where the first comprehensive fault information includes the first fault information and correlated fault information of the first fault information. The virtualized infrastructure manager also includes a processing unit, configured to perform fault repair or reporting processing according to the first comprehensive fault information.

According to a sixth aspect, a virtualized network functions manager is provided. The virtualized network functions manager includes an acquiring unit, configured to acquire second fault information, including a faulty entity identifier and a fault type, of a virtualized network function (VNF) entity, where the second fault information is used to indicate that a fault occurs in a first VNF entity having the faulty entity identifier. The virtualized network functions manager also includes a generating unit, configured to generate second comprehensive fault information according to the second fault information. The virtualized network functions manager also includes a processing unit, configured to perform fault repair or reporting processing according to the second comprehensive fault information.

According to a seventh aspect, an orchestrator is provided. The orchestrator includes a receiving unit, configured to receive first comprehensive fault information sent by a virtualized infrastructure manager (VIM), where the first comprehensive fault information includes first fault information, the first fault information includes a faulty entity identifier and a fault type, and the first fault information is used to indicate that a fault occurs in a first network function virtualization infrastructure (NFVI) entity having the faulty entity identifier. The orchestrator also includes a processing unit, configured to perform fault repair or reporting processing according to the first comprehensive fault information.

According to an eighth aspect, an orchestrator is provided. The orchestrator includes a receiving unit, configured to receive second comprehensive fault information sent by a virtualized network function manager (VNFM), where the second comprehensive fault information includes second fault information, the second fault information includes a faulty entity identifier and a fault type, and the second fault information is used to indicate that a fault occurs in a first virtualized network function (VNF) entity having the faulty entity identifier. The orchestrator also includes a processing unit, configured to perform fault repair or reporting processing according to the second comprehensive fault information.

According to the fault management method provided in the embodiments of the present application, a VIM and a VNFM acquire fault information of a hardware and/or software entity, to perform comprehensive processing on correlated pieces of fault information, which can implement fault reporting and processing in an NFV environment.

BRIEF DESCRIPTION OF THE DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
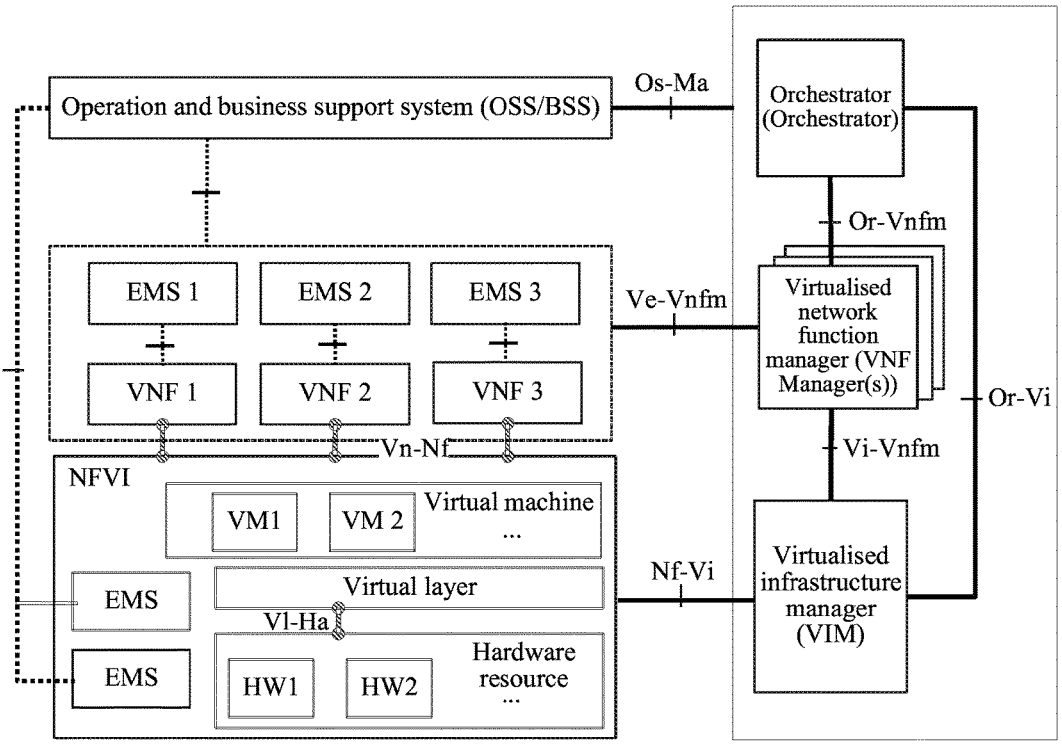
FIG. 1 is a system architectural diagram of network function virtualization (NFV) according to the present application.

FIG. 1 is a system architectural diagram of network function virtualization (NFV) according to the present application.

In a network function virtualization (NFV) end to end (E2E) architecture, network function virtualization infrastructure (NFVI) includes a bottom-layer hardware (HW) resource, which may be specifically classified into computing hardware, storage hardware, network hardware, and the like. A virtualization layer is located on the hardware layer, and includes a host operating system (Host OS) and a super management program/virtual machine manager (Hypervisor), and multiple virtual machines (VM) run at the virtualization layer. The HW and the Hypervisor are connected to an operation and business support system (OSS/BSS) by using an element management system (EMS). Multiple virtualized network functions (VNF) instances on the NFVI are connected to the OSS/BSS by using a vEMS.

The NFVI is connected to a virtualized infrastructure manager (VIM) by using an Nf-Vi interface, the VNF is connected to a VNF manager (VNFM) by using a Ve-Vnfm interface, and the VIM is connected to the VNFM by using a Vi-Vnfm interface. The NFVI is connected to an orchestrator (Orchestrator) by using Or-Vi, the VNFM is connected to the Orchestrator by using Or-Vnfm, and the Orchestrator is connected to the OSS/BSS by using an Os-Ma interface.

The OSS/BSS is configured to initiate a service request to the Orchestrator, the Orchestrator is responsible for orchestrating and managing resources according to the OSS/BSS service request, implementing an NFV service, and detecting in real time resources and running state information of the VNF and the NFVI. The VNFM is responsible for managing a life cycle of the VNF, for example, starting, time to live, detecting and collecting running state information of the VNF. The VIM is responsible for managing and allocating resources of the NFVI, and detecting and collecting running state information of the NFVI.

Figure 2:
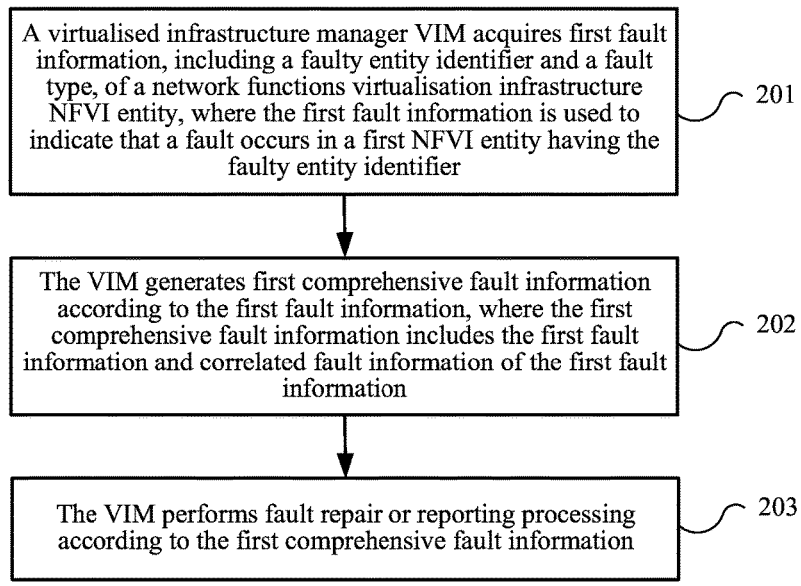
FIG. 2 is a flowchart of a fault management method according to an embodiment of the present application.

FIG. 2 is a flowchart of a fault management method according to an embodiment of the present application. The method in FIG. 2 is executed by a VIM.

201: A virtualized infrastructure manager (VIM) acquires first fault information, including a faulty entity identifier and a fault type, of a network function virtualization infrastructure (NFVI) entity, where the first fault information is used to indicate that a fault occurs in a first NFVI entity having the faulty entity identifier.

202: The VIM generates first comprehensive fault information according to the first fault information, where the first comprehensive fault information includes the first fault information and correlated fault information of the first fault information.

203: The VIM performs fault repair or reporting processing according to the first comprehensive fault information.

According to the fault management method provided in this embodiment of the present application, a VIM acquires fault information of a hardware and/or software entity, to perform comprehensive processing on correlated pieces of fault information, which can implement fault reporting and processing in an NFV environment.

Optionally, in an embodiment, step 201 includes: receiving the first fault information sent by the first NFVI entity; or determining that a fault occurs in the first NFVI entity, and generating the first fault information according to the fault of the first NFVI entity. That is, the VIM may passively receive fault information of a faulty entity, or may actively generate fault information after detecting a fault.

Optionally, in an embodiment, the first NFVI entity is any hardware (HW), host operating system (Host OS), virtual machine manager, or virtual machine (VM) entity in the NFVI entity, and step 202 includes: determining that fault information sent by an NFVI entity correlated with the first NFVI entity is the correlated fault information of the first fault information, and generating the first comprehensive fault information that includes the first fault information and the correlated fault information. Because a correlation exists between some HW, Host OS, Hypervisor, and VM entities, when a fault occurs in the first NFVI entity, a fault may also occur in another NFVI entity correlated with the first NFVI. The VIM may collect all related fault information, so as to perform uniform and comprehensive processing.

Optionally, in an embodiment, step 203 includes: determining, according to the fault type in the first fault information in the first comprehensive fault information or a fault type in the correlated fault information in the first comprehensive fault information, whether the VIM includes a fault repair policy that corresponds to the fault type in the first fault information or the fault type in the correlated fault information; and when the VIM includes the fault repair policy that corresponds to the fault type in the first fault information or the fault type in the correlated fault information, repairing, according to the fault repair policy, the fault of the first NFVI entity and/or a fault of the NFVI entity correlated with the first NFVI entity; or when the VIM does not include the fault repair policy that corresponds to the fault type in the first fault information or the fault type in the correlated fault information, sending the first comprehensive fault information to a VNFM or sending the first comprehensive fault information to an orchestrator.

Specifically, after generating comprehensive fault information, the VIM first needs to determine whether the VIM is capable of processing the comprehensive fault information locally; and if the VIM is capable of processing the comprehensive fault information, the VIM repairs a fault of one NFVI entity involved in the comprehensive fault information; or if the VIM is incapable of processing the comprehensive fault information or the repair fails, the VIM performs reporting processing.

Optionally, in an embodiment, the determining, according to the fault type in the first fault information in the first comprehensive fault information or a fault type in the correlated fault information in the first comprehensive fault information, whether the VIM includes a fault repair policy that corresponds to the fault type in the first fault information or the fault type in the correlated fault information includes: determining an NFVI entity having a highest priority from the first NFVI entity and the NFVI entity correlated with the first NFVI entity, where a priority of the HW is higher than a priority of the Host OS, the priority of the Host OS is higher than a priority of the virtual machine manager, and the priority of the virtual machine manager is higher than a priority of the VM; determining, according to a fault type of the NFVI entity having a highest priority, whether the VIM includes a corresponding fault repair policy; and when the VIM includes the fault repair policy corresponding to the fault type of the NFVI entity having a highest priority, repairing, according to the fault repair policy, a fault of the NFVI entity having a highest priority.

Optionally, in an embodiment, after the repairing, according to the fault repair policy, the fault of the first NFVI entity and/or a fault of the NFVI entity correlated with the first NFVI entity, the method may further include: when the fault repair succeeds, sending a success indication message to the orchestrator; or when the fault repair fails, sending the first comprehensive fault information to the VNFM or sending the first comprehensive fault information to the orchestrator, where the success indication message may be fault information in which a running state is set to "Normal", or may be a message in another form and used to indicate that the repair succeeds, which is not limited in the present application.

Optionally, in an embodiment, after the sending the first comprehensive fault information to the VNFM, the method further includes: receiving an indication message that is sent by the VNFM and is used to indicate that the VNFM is incapable of processing the first comprehensive fault information, and sending the first comprehensive fault information to the orchestrator. In a case in which the VIM in incapable of processing the first comprehensive fault information and reporting the first comprehensive fault information to the VNFM, if the VNFM is also incapable of processing the first comprehensive fault information, the VNFM further reports the first comprehensive fault information to the Orchestrator.

Optionally, in an embodiment, before the sending the first comprehensive fault information to the orchestrator, the method further includes: requesting, from the VNFM, fault information of a VNF entity correlated with the first NFVI entity, and adding the fault information of the VNF entity correlated with the first NFVI entity to the first comprehensive fault information. When the VIM is incapable of processing the first comprehensive fault information or the repair fails, the VIM may initiate a request to the VNFM, to acquire fault information of a VNF entity correlated with a faulty NFVI entity, and perform comprehensive reporting, so that an upper-layer management entity can perform comprehensive processing.

Optionally, in an embodiment, the method further includes: receiving request information sent by the VNFM, where the request information is used to request, from the VIM, fault information of an NFVI entity correlated with a faulty VNF entity, and sending the fault information of the NFVI entity correlated with the faulty VNF entity to the VNFM. Specifically, when the VNFM is incapable of processing comprehensive fault information of a VNF entity, the VNFM may still request, from the VIM, fault information of a related NFVI, and perform comprehensive reporting, so that an upper-layer management entity can perform comprehensive processing.

Optionally, in an embodiment, after the generating, by the VIM, first comprehensive fault information according to the first fault information, the method further includes: detecting, according to the first comprehensive fault information, whether the VIM includes comprehensive fault information that is the same as the first comprehensive fault information; and when the VIM includes the comprehensive fault information that is the same as the first comprehensive fault information, deleting the first comprehensive fault information.

Specifically, because when correlated faults occur in multiple correlated NFVI entities, the VIM may acquire multiple pieces of same comprehensive fault information, where the same herein refers to: content of fault information in the comprehensive fault information is the same. In this case, the VIM may perform repeated-alarm detection. The VIM continues to process comprehensive fault information that is being processed, and deletes the same comprehensive fault information that is not processed yet.

Optionally, in an embodiment, the first fault information is further reported to an operation and business support system (OSS/BSS), so that the OSS/BSS monitors and presents the first fault information.

Optionally, in an embodiment, the first fault information further includes at least one of a running state and fault time, the first comprehensive fault information further includes fault state information, and the fault state includes at least one of not processed yet, being processed, repaired, and not repaired yet.

In the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 3:
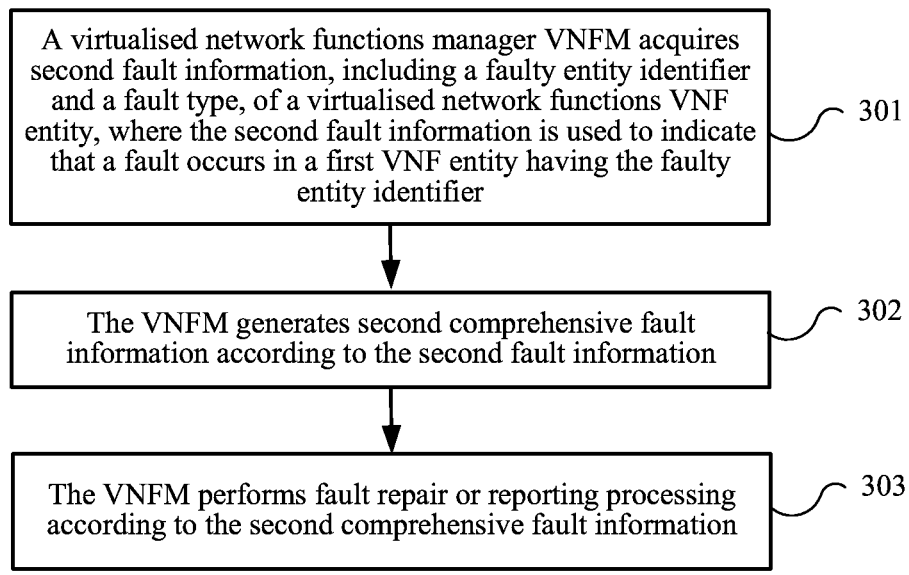
FIG. 3 is a flowchart of a fault management method according to an embodiment of the present application.

FIG. 3 is a flowchart of a fault management method according to an embodiment of the present application. The method in FIG. 3 is executed by a VNFM.

301: A virtualized network function manager (VNFM) acquires second fault information, including a faulty entity identifier and a fault type, of a virtualized network function (VNF) entity, where the second fault information is used to indicate that a fault occurs in a first VNF entity having the faulty entity identifier.

302: The VNFM generates second comprehensive fault information according to the second fault information.

303: The VNFM performs fault repair or reporting processing according to the second comprehensive fault information.

According to the fault management method provided in this embodiment of the present application, a VNFM acquires fault information of a hardware and/or software entity, to perform comprehensive processing on correlated pieces of fault information, which can implement fault reporting and processing in an NFV environment.

Optionally, in an embodiment, step 301 includes: receiving the second fault information sent by the first VNF entity; or determining that a fault occurs in the first VNF entity, and generating the second fault information according to the fault of the first VNF entity. That is, the VNFM may passively receive fault information of a faulty entity, or may actively generate fault information after detecting a fault.

Optionally, in an embodiment, step 302 includes: determining that fault information sent by a VNF entity correlated with the first VNF entity is correlated fault information of the second fault information, and generating the second comprehensive fault information that includes the second fault information and the correlated fault information. Because a correlation may exist between VNF entities, when a fault occurs in the first VNF entity, a fault may also occur in another VNF entity correlated with the first VNF entity. The VNFM may collect all related fault information, so as to perform uniform and comprehensive processing.

Optionally, in an embodiment, step 303 includes: determining, according to a fault type in the second fault information in the second comprehensive fault information or a fault type in the correlated fault information in the second comprehensive fault information, whether the VNFM includes a fault repair policy that corresponds to the fault type in the second fault information or the fault type in the correlated fault information; and when the VNFM includes the fault repair policy that corresponds to the fault type in the second fault information or the fault type in the correlated fault information, repairing, according to the fault repair policy, the fault of the first VNF entity and/or a fault of the VNF entity correlated with the first VNF entity; or when the VNFM does not include the fault repair policy that corresponds to the fault type in the second fault information or the fault type in the correlated fault information, sending the second comprehensive fault information to an orchestrator.

Specifically, after generating comprehensive fault information, the VNFM first needs to determine whether the VNFM is capable of processing the comprehensive fault information locally; and if the VNFM is capable of processing the comprehensive fault information, the VNFM repairs a fault of one VNF entity involved in the comprehensive fault information; or if the VNFM is incapable of processing the comprehensive fault information or the repair fails, the VNFM performs reporting processing.

Optionally, in an embodiment, after the repairing, according to the fault repair policy, the fault of the first VNF entity and/or a fault of the VNF entity correlated with the first VNF entity, the method further includes: when the fault repair succeeds, sending a success indication message to the orchestrator; or when the fault repair fails, sending the second comprehensive fault information to the orchestrator, where the success indication message may be fault information in which a running state is set to "Normal", or may be a message in another form and used to indicate that the repair succeeds, which is not limited in the present application.

Optionally, in an embodiment, before the sending the second comprehensive fault information to the orchestrator, the method further includes: requesting, from a virtualized infrastructure manager (VIM), fault information of an NFVI entity correlated with the first VNF entity, where the NFVI entity is any hardware (HW), host operating system (Host OS), virtual machine manager, or virtual machine (VM) entity in the NFVI; and adding the fault information of the NFVI entity correlated with the first VNF entity to the second comprehensive fault information. When the VNFM is incapable of processing the second comprehensive fault information or the repair fails, the VNFM may initiate a request to the VIM, to acquire fault information of an NFVI entity correlated with a faulty VNF entity, and perform comprehensive reporting, so that an upper-layer management entity can perform comprehensive processing.

Optionally, in an embodiment, the method further includes: receiving first comprehensive fault information sent by a VIM, where the first comprehensive fault information includes first fault information and correlated fault information of the first fault information, and the first fault information is used to indicate that a fault occurs in a first NFVI entity; determining whether the VNFM includes a fault repair policy that corresponds to a fault type in the first fault information in the first comprehensive fault information or a fault type in the correlated fault information in the first comprehensive fault information; and when the VNFM includes the fault repair policy that corresponds to the fault type in the first fault information or the fault type in the correlated fault information, repairing, according to the fault repair policy, the fault of the first NFVI entity and/or a fault of an NFVI entity correlated with the first NFVI entity; or when the VNFM does not include the fault repair policy that corresponds to the fault type in the first fault information or the fault type in the correlated fault information, sending the first comprehensive fault information to an orchestrator, or sending an indication message used to indicate that the VNFM is incapable of processing the first comprehensive fault information to the VIM, so that the VIM sends the first comprehensive fault information to the orchestrator. When the VIM is incapable of processing the first comprehensive fault information of the NFVI entity or the repair fails, the VIM reports the first comprehensive fault information to the VNFM. If the VNFM is also incapable of processing the first comprehensive fault information or the repair fails, the VNFM notifies the VIM, so that the VIM reports the first comprehensive fault information to the Orchestrator.

Optionally, in an embodiment, after the receiving first comprehensive fault information sent by the VIM, the method further includes: determining, according to the first comprehensive fault information, fault information of a first VNF entity that is correlated with the first NFVI entity and/or is correlated with the NFVI entity correlated with the first NFVI entity, and adding the fault information of the first VNF entity to the first comprehensive fault information, so that the VNFM performs repair or reporting processing on the first comprehensive fault information.

Optionally, in an embodiment, after the performing, by the VNFM, fault repair or reporting processing according to the second comprehensive fault information, the method further includes: detecting, according to the second comprehensive fault information, whether the VNFM includes comprehensive fault information that is the same as the second comprehensive fault information; and when the VNFM includes the comprehensive fault information that is the same as the second comprehensive fault information, deleting the second comprehensive fault information.

Specifically, because when correlated faults occur in multiple correlated VNF entities, the VNFM may acquire multiple pieces of same comprehensive fault information, where the same herein refers to: content of fault information in the comprehensive fault information is the same. In this case, the VNFM may perform repeated-alarm detection. The VNFM continues to process comprehensive fault information that is being processed, and deletes the same comprehensive fault information that is not processed yet.

Optionally, in an embodiment, the method further includes: receiving request information sent by the VIM, where the request information is used to request, from the VNFM, fault information of a VNF entity correlated with a faulty NFVI entity, and sending the fault information of the VNF entity correlated with the faulty NFVI entity to the VIM.

Optionally, in an embodiment, the second fault information is further reported to an operation and business support system (OSS/BSS), so that the OSS/BSS monitors and presents the second fault information.

Optionally, in an embodiment, the second fault information further includes at least one of a running state and fault time, the second comprehensive fault information further includes fault state information, and the fault state includes at least one of not processed yet, being processed, repaired, and not repaired yet.

In the fault management method provided in this embodiment of the present application, a VNFM acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 4:
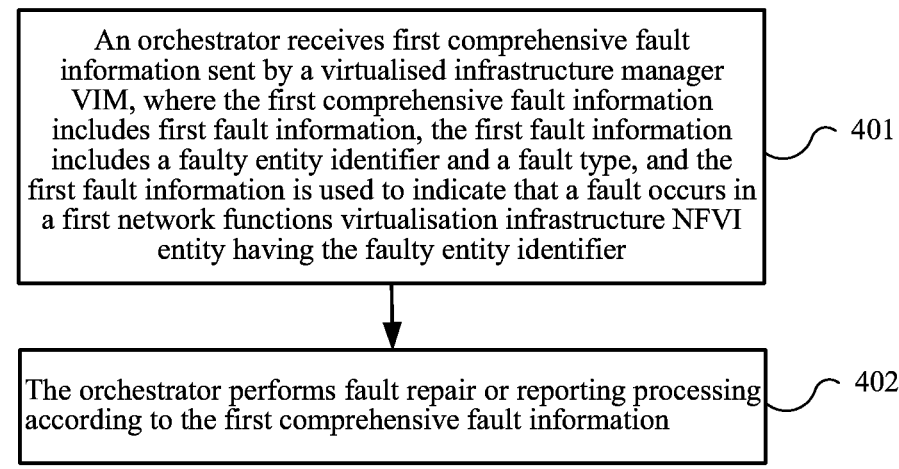
FIG. 4 is a flowchart of a fault management method according to an embodiment of the present application.

FIG. 4 is a flowchart of a fault management method according to an embodiment of the present application. The method in FIG. 4 is executed by an Orchestrator.

401: An orchestrator receives first comprehensive fault information sent by a virtualized infrastructure manager (VIM), where the first comprehensive fault information includes first fault information, the first fault information includes a faulty entity identifier and a fault type, and the first fault information is used to indicate that a fault occurs in a first network functions virtualization infrastructure (NFVI) entity having the faulty entity identifier.

402: The orchestrator performs fault repair or reporting processing according to the first comprehensive fault information.

According to the fault management method provided in this embodiment of the present application, an Orchestrator acquires fault information of a hardware and/or software entity, to perform comprehensive processing on correlated pieces of fault information, which can implement fault reporting and processing in an NFV environment.

Optionally, in an embodiment, the first comprehensive fault information further includes fault information of an NFVI entity correlated with the first NFVI entity, and/or fault information of a virtualized network function (VNF) entity correlated with the first NFVI entity. That is, comprehensive fault information acquired by the Orchestrator from the VIM may include fault information of an NFVI entity, or may include fault information of an NFVI entity and a related VNF entity.

Optionally, in an embodiment, step 402 includes: determining, according to the fault type in the first comprehensive fault information, whether the orchestrator includes a fault repair policy corresponding to the fault type; and when the orchestrator includes the fault repair policy corresponding to the fault type, repairing the fault of the first NFVI entity and/or a fault of the NFVI entity correlated with the first NFVI entity; or when the orchestrator does not include the fault repair policy corresponding to the fault type, sending the first comprehensive fault information to an operation and business support system (OSS/BSS).

Optionally, in an embodiment, step 402 includes: determining, according to the fault type in the first comprehensive fault information, whether the orchestrator includes a fault repair policy corresponding to the fault type; and when the orchestrator includes the fault repair policy corresponding to the fault type, repairing the fault of the first NFVI entity, a fault of the NFVI entity correlated with the first NFVI entity, and a fault of the VNF entity correlated with the first NFVI entity; or when the orchestrator does not include the fault repair policy corresponding to the fault type, sending the first comprehensive fault information to an OSS/BSS.

Optionally, in an embodiment, before step 402, the method further includes: detecting, according to the first comprehensive fault information, whether the orchestrator includes comprehensive fault information that is the same as the first comprehensive fault information; and when the orchestrator includes the comprehensive fault information that is the same as the first comprehensive fault information, deleting the first comprehensive fault information. Specifically, because when correlated faults occur in multiple correlated NFVI entities or VNF entities, the Orchestrator may acquire multiple pieces of same comprehensive fault information, where the same herein refers to: content of fault information in the comprehensive fault information is the same. In this case, the Orchestrator may perform repeated-alarm detection. The orchestrator continues to process comprehensive fault information that is being processed, and deletes the same comprehensive fault information that is not processed yet.

Optionally, in an embodiment, the first fault information further includes at least one of a running state and fault time, the first comprehensive fault information further includes fault state information, and the fault state includes at least one of not processed yet, being processed, repaired, and not repaired yet.

According to the fault management method provided in this embodiment of the present application, an Orchestrator receives comprehensive fault information reported by a VIM, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 5:
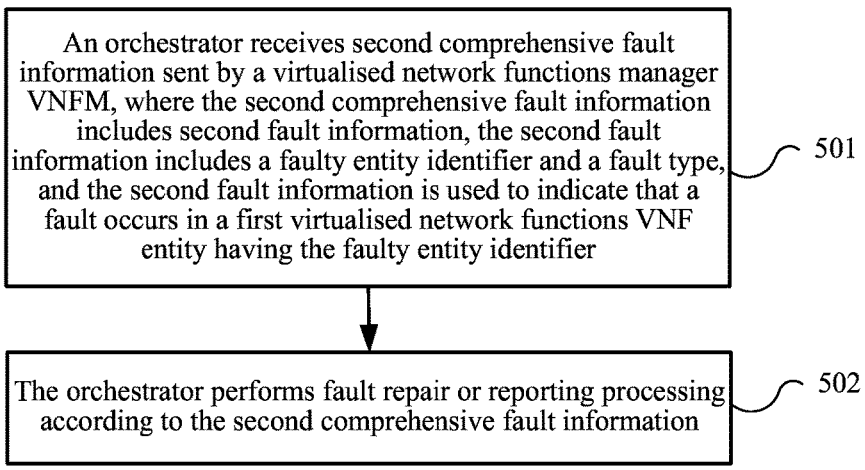
FIG. 5 is a flowchart of a fault management method according to an embodiment of the present application.

FIG. 5 is a flowchart of a fault management method according to an embodiment of the present application. The method in FIG. 5 is executed by an Orchestrator.

501: An orchestrator receives second comprehensive fault information sent by a virtualized network function manager (VNFM), where the second comprehensive fault information includes second fault information, the second fault information includes a faulty entity identifier and a fault type, and the second fault information is used to indicate that a fault occurs in a first virtualized network functions VNF entity having the faulty entity identifier.

502: The orchestrator performs fault repair or reporting processing according to the second comprehensive fault information.

According to the fault management method provided in this embodiment of the present application, an Orchestrator acquires fault information of a hardware and/or software entity, to perform comprehensive processing on correlated pieces of fault information, which can implement fault reporting and processing in an NFV environment.

Optionally, in an embodiment, the second comprehensive fault information further includes fault information of a VNF entity correlated with the first VNF entity, and/or fault information of a virtualized infrastructure manager (NFVI) entity correlated with the first VNF entity. That is, comprehensive fault information acquired by the Orchestrator from the VNFM may include fault information of an NFVI entity, or may include fault information of a VNF entity, or may include fault information of an NFVI entity and a related VNF entity.

Optionally, in an embodiment, step 502 includes: determining, according to the fault type in the second comprehensive fault information, whether the orchestrator includes a fault repair policy corresponding to the fault type; and when the orchestrator includes the fault repair policy corresponding to the fault type, repairing the fault of the first VNF entity and/or a fault of the VNF entity correlated with the first VNF entity; or when the orchestrator does not include the fault repair policy corresponding to the fault type, sending the second comprehensive fault information to an operation and business support system (OSS/BSS).

Optionally, in an embodiment, step 502 includes: determining, according to the fault type in the second comprehensive fault information, whether the orchestrator includes a fault repair policy corresponding to the fault type; and when the orchestrator includes the fault repair policy corresponding to the fault type, repairing the fault of the first VNF entity, a fault of the VNF entity correlated with the first VNF entity, and a fault of the NFVI entity correlated with the first VNF entity; or when the orchestrator does not include the fault repair policy corresponding to the fault type, sending the second comprehensive fault information to an OSS/BSS.

Optionally, in an embodiment, before step 502, the method further includes: detecting, according to the second comprehensive fault information, whether the orchestrator includes comprehensive fault information that is the same as the second comprehensive fault information; and when the orchestrator includes the comprehensive fault information that is the same as the second comprehensive fault information, deleting the second comprehensive fault information. Specifically, because when correlated faults occur in multiple correlated NFVI entities or VNF entities, the Orchestrator may acquire multiple pieces of same comprehensive fault information, where the same herein refers to: content of fault information in the comprehensive fault information is the same. In this case, the Orchestrator may perform repeated-alarm detection. The orchestrator continues to process comprehensive fault information that is being processed, and deletes the same comprehensive fault information that is not processed yet.

Optionally, in an embodiment, the second fault information further includes at least one of a running state and fault time, the second comprehensive fault information further includes fault state information, and the fault state includes at least one of not processed yet, being processed, repaired, and not repaired yet.

According to the fault management method provided in this embodiment of the present application, an Orchestrator receives comprehensive fault information reported by a VNFM, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 6A:
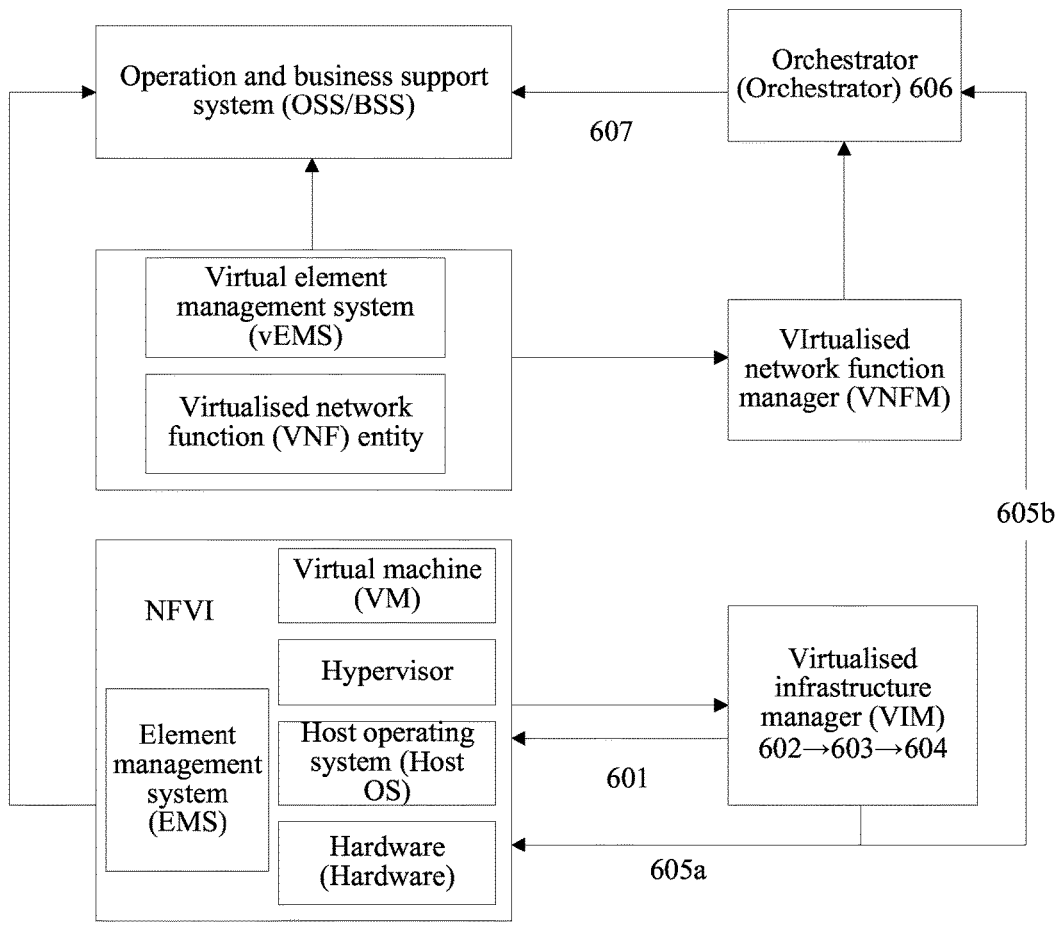
FIG. 6a is an interaction diagram of a fault management method according to an embodiment of the present application.

FIG. 6a is an interaction diagram of a fault management method according to an embodiment of the present application. The method in FIG. 6a may be executed by the NFV system shown in FIG. 1.

601: A VIM acquires fault information.

When the VIM detects that a fault occurs in any HW, Host OS, Hypervisor, or VM in an NFVI, the VIM acquires fault information of the faulty NFVI entity. Specifically, the acquired fault information may be generated and reported to the VIM by the faulty NFVI entity, or may be generated locally by the VIM according to a detected fault.

The VIM may detect, by using the following methods, that a fault occurs in an NFVI entity:

For the convenience of description, the following is described by using an example in which a fault occurs in a first NFVI entity, where the first NFVI entity may be any HW, Host OS, Hypervisor, or VM in the NFVI, and the entity may include a hardware entity or a software entity.

Method 1:

When a fault occurs in the first NFVI entity, the first NFVI entity generates fault information, where the fault information includes at least a faulty entity identifier that is used to uniquely identify the first NFVI entity, and an actual position of the faulty first NFVI entity or a position of the faulty first NFVI entity in a topology relationship may be determined uniquely by using the identifier. The fault information further includes a fault identifier, used to uniquely identify fault information. The fault information further includes a fault type, used to represent a cause of the fault, for example, overload, power-off, memory leakage, port error, or no fault. In addition, the fault information may further include a running state and fault time, where the running state is used to mark whether the first NFVI entity currently can work normally, and the fault time may be used to record a time when the fault occurs. As an example, a format of the fault information may be shown in Table 1:

TABLE 1

| Fault information | | | | | |
|---|---|---|---|---|---|
| Fault identifier | Faulty entity identifier | Fault type | Running state | Fault time | Others |
| Uniquely identify fault information | ID of an NFVI entity | Overload/ power-off/ no fault . . . | Normal/ faulty . . . | Time | |

After generating the fault information in the foregoing format, the first NFVI may send the fault information to the VIM by using an Nf-Vi interface, and optionally, the first NFVI may also send, by using an EMS, the fault information to an OSS/BSS for management, recording, and presentation.

Method 2:

The VIM may send an indication message to the first NFVI entity periodically or when required, to instruct the first NFVI entity to perform fault detection. If the first NFVI entity detects a fault, the first NFVI entity may return fault information similar to that in Table 1 to the VIM; or if the first NFVI entity is not faulty, the first NFVI entity may return no message, or may return fault information, in which a fault type is "No fault" and a running state is "Normal", shown in Table 1.

Method 3:

The first NFVI entity may periodically send a heartbeat indication message indicating that the first NFVI entity runs normally to the VIM. The VIM periodically receives heartbeats of the first NFVI entity, and senses that the first NFVI entity works normally. When the heartbeats of the first NFVI entity are interrupted, the VIM determines that a fault occurs in the first NFVI entity, and the VIM may generate fault information of the first NFVI. A specific format of the fault information is similar to that of the fault information in Table 1, and no further details are described herein again.

When the NFVI entity cannot report fault information due to an unexpected event such as power-off, the VIM can still sense immediately that a fault occurs in the first NFVI entity.

Method 4:

The VIM may perform fault detection on the NFVI periodically or when required, and then, the VIM generates fault information of the first NFVI according to a fault detection result. A specific format of the fault information is similar to that of the fault information in Table 1, and no further details are described herein again.

In conclusion, the VIM may detect the fault of the NFVI entity by using any one of the foregoing methods, and certainly, may perform detection by combining multiple methods, for example, combining Method 1 and Method 3. The NFVI entity sends heartbeats to the VIM periodically, and when a fault occurs, sends fault information to the VIM. If the NFVI entity cannot report the fault information due to a catastrophic fault, the VIM may sense, according to stopping of the heartbeats, that a fault occurs in the NFVI entity.

602: The VIM generates comprehensive fault information.

After the VIM receives the fault information sent by the first NFVI entity, or the VIM generates fault information according to a fault of the first NFVI entity, the VIM needs to collect fault information of another NFVI entity correlated with the first NFVI entity, to generate comprehensive fault information, so as to perform comprehensive processing.

Figure 6B:
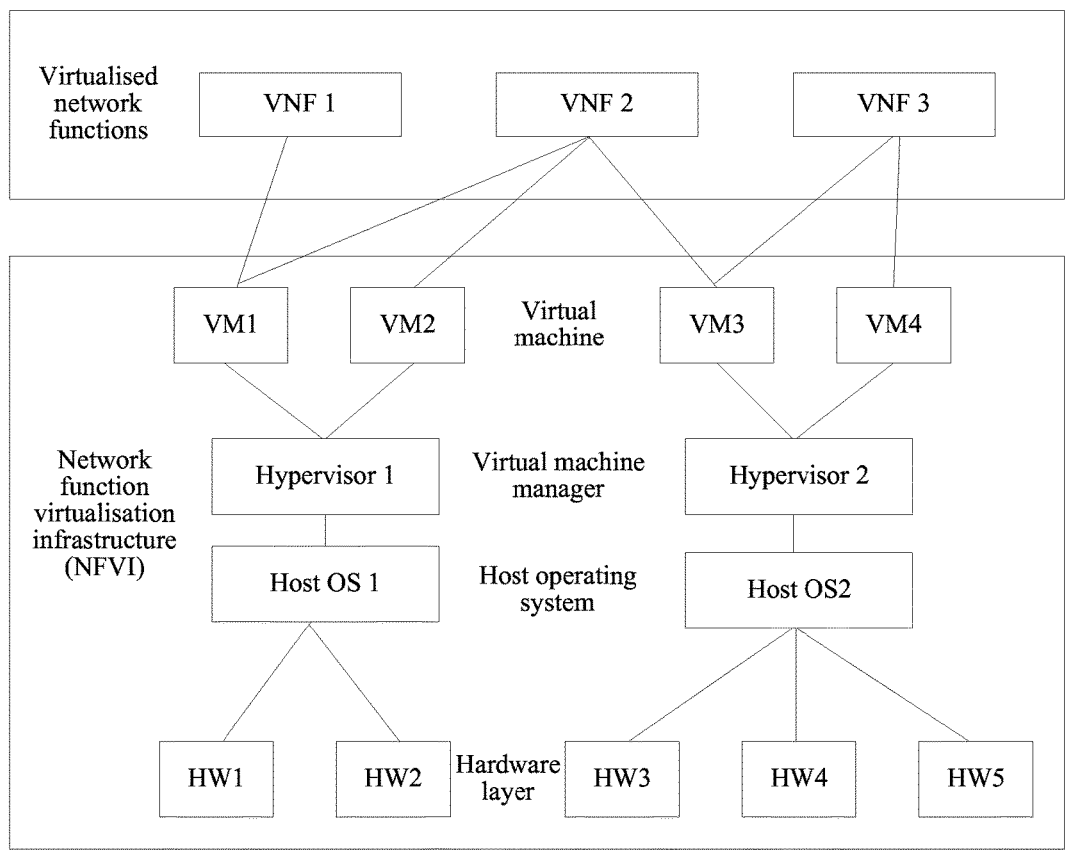
FIG. 6b is a schematic diagram of a correlation between entities according to an embodiment of the present application.

Specifically, because a correlation exists between HW, Host OS, Hypervisor, and VM entities, when a fault occurs in the first NFVI entity, faults may also occur in some entities correlated with the first NFVI entity. FIG. 6b exemplarily shows the correlation between the HW, Host OS, Hypervisor, and VM entities. For example, a Host OS1, a Hypervisor1, a VM1, and a VM2 are correlated with the HW1. That means, when a fault occurs in the HW1, faults may also occur in virtualized entities established on the HW1: the Host OS1, the Hypervisor1, the VM1, and the VM2. In this case, the VIM may collect fault information reported by the Host OS1, the Hypervisor1, the VM1, and the VM2, and generate comprehensive fault information with reference to fault information of the HW1. Specifically, comprehensive fault information shown in Table 2 may be generated:

TABLE 2

| Comprehensive fault information | | | | | | |
|---|---|---|---|---|---|---|
| Identifier of comprehensive fault information | Fault information of HW | Fault information of a Host OS | Fault information of a Hypervisor | Fault information of a VM | Fault state | Others |
| Uniquely identify comprehensive fault information | HW1 | Host OS1 | Hypvisior1 | VM1, VM2 | Not processed yet/ being processed/ repaired/ not repaired yet | |

A format of fault information of the HW, Host OS, Hypervisor, and VM entities is similar to that in Table 1. The identifier of the comprehensive fault information is used to uniquely identify comprehensive fault information. It should be understood that, the comprehensive fault information shown in Table 2 is a specific example, and fault information of entities that is specifically included in the comprehensive fault information is determined according to the correlation. When the comprehensive fault information is just generated, a fault state may be set to "Not processed yet".

603: Perform repeated-alarm detection.

After generating the comprehensive fault information, the VIM may locally detect the generated comprehensive fault information, to determine whether there is same information. Specifically, because after a fault occurs in an NFVI entity, all correlated faulty NFVI entities may report fault information, and the VIM may generate multiple pieces of same comprehensive fault information for a same fault. For example, if a fault occurs in the HW1, faults also occur in the Host OS1, Hypervisor1, VM1, and VM2 correlated with the HW1, and the Host OS1, Hypervisor1, VM1, and VM2 correlated with the HW1 perform a same operation as the HW1. The VIM may generate multiple pieces of same comprehensive fault information after collecting correlated fault information, and in this case, the VIM may process only one piece of comprehensive fault information, and discard the other same comprehensive fault information. It should be understood that, the same comprehensive fault information refers to: the fault information of the HW, Host OS, Hypervisor, and VM are partially the same, and the fault identifiers and fault states may be different.

Specifically, the comprehensive fault information may be reserved or discarded according to the fault state in the comprehensive fault information, for example, a fault state in comprehensive fault information that is just generated is "Not processed yet", repeated-alarm detection is performed on the comprehensive fault information, and if same comprehensive fault information in which a fault state is "Being processed" is found, the comprehensive fault information that is not processed yet is discarded, and comprehensive fault information in which a fault state is "Being processed" is reserved and processed.

604: The VIM performs self-healing determining.

When the VIM generates the comprehensive fault information, the VIM may first determine whether a fault type in the comprehensive fault information is a fault type that the VIM can process.

Specifically, the VIM has a fault repair policy, where the fault repair policy includes a mapping between a faulty entity identifier, a fault type, and a fault repair method. Whether processing can be performed may be determined by determining whether the fault type in the comprehensive fault information exists in the fault repair policy. For example, a fault type of HW1 is "low performance", and a corresponding fault repair method is "restart".

In addition, when the comprehensive fault information includes fault information of multiple correlated NFVI entities, the VIM may determine, according to priorities of the NFVI entities, to perform self-healing determining on a fault type in fault information of an NFVI entity. The priorities are: HW>Host OS>Hypervisor>VM. For example, as shown in Table 2, when the comprehensive fault information includes fault information of the HW1, the Host OS1, the Hypervisor1, the VM1, and the VM2, the VIM may process a fault of the HW1 preferentially, that is, determine, according to a fault type in fault information of the HW1 such as "low performance", that a fault repair method is "restart".

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

605a: The VIM can perform self-healing processing.

If the VIM determines that processing can be performed, the VIM performs fault repair on the NFVI entity according to the fault repair method. If the fault repair succeeds, and faults of correlated NFVI entities are repaired, an Orchestrator is notified that the repair succeeds, and the fault repair processing process is terminated.

If the comprehensive fault information includes multiple NFVI entities, and a fault of an NFVI entity that is processed preferentially is repaired successfully, but faults of other correlated NFVI entities persist, step 604 is repeated, to determine and repair an NFVI entity having a highest priority in the remaining faulty NFVI entities until faults of all NFVI entities in the comprehensive fault information are repaired. Then, the Orchestrator is notified that the repair succeeds, and the fault repair processing process is terminated.

Specifically, for the comprehensive fault information that can be processed, the VIM may set a repair state to "Being processed", so as to avoid repeated processing on same comprehensive fault information that is generated subsequently and in which a state is "Not processed yet".

The NFVI entity that is repaired successfully may notify, by reporting fault information in which a running state is "Normal" and that is similar to the fault information in Table 1, the VIM that the fault repair succeeds. When faults of all correlated NFVI entities in the comprehensive fault information are repaired, the VIM may set a fault state in the comprehensive fault information to "Repaired", and report the comprehensive fault information to the Orchestrator by using an Or-Vi interface. It should be understood that, repair success may also be reported by using predefined signaling, which is not limited in the present application.

In addition, the NFVI entity that is being repaired may be isolated, to avoid further fault infection that is caused by interaction between the faulty entity and another adjacent entity.

605b: The VIM cannot perform self-healing processing.

If the fault repair policy in the VIM does not include a fault type of a to-be-repaired NFVI entity, the VIM may set the fault state in the comprehensive fault information to "Not repaired yet", and report the comprehensive fault information to the Orchestrator by using an Or-Vi interface.

606: The Orchestrator performs self-healing determining.

When the Orchestrator receives the comprehensive fault information sent by the VIM, the Orchestrator detects whether self-healing processing can be performed, which is similar to self-healing determining of the VIM. The Orchestrator queries a local fault repair policy, and if the processing can be performed and the repair succeeds, the orchestrator sets the fault state in the comprehensive fault information to "Repaired", and reports the comprehensive fault information to the OSS/BSS; or if the Orchestrator cannot perform repair processing, or can perform repair processing but the repair fails, the orchestrator sets the fault state in the comprehensive fault information of the NFVI to "Not repaired yet", and reports the comprehensive fault information to the OSS/BSS. It should be understood that because the Orchestrator is responsible for orchestrating and managing resources, and implementing an NFV service, the Orchestrator has relatively high administration permission and processing capabilities, and can repair most faults. Only a very small quantity of faults that cannot be processed or whose repair fails are reported to the OSS/BSS.

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

607: An OSS/BSS performs fault repair.

The OSS/BSS sets a fault state in the received comprehensive fault information to "Being processed". Then, the OSS/BSS performs fault repair according to a method in the fault repair policy. After the fault is recovered, the OSS/BSS may receive a fault recovery notification sent by an NFVI entity, and then the OSS/BSS modifies the fault state in the comprehensive fault information to "Repaired". The fault repair policy in the OSS/BSS includes processing methods of all fault types by default.

According to the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, same comprehensive fault information is deleted by means of repeated-alarm detection, and a faulty entity that is being processed is isolated, the fault processing efficiency and accuracy are improved and fault infection is effectively prevented.

Figure 7:
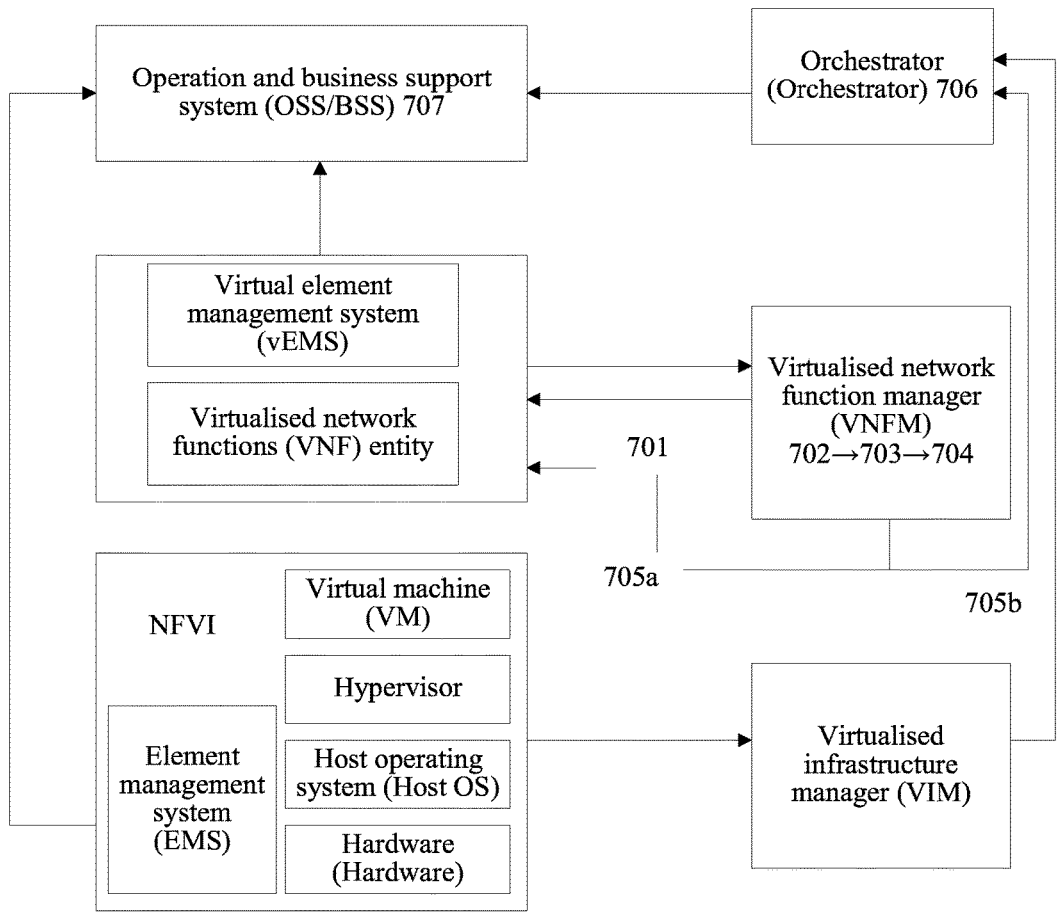
FIG. 7 is an interaction diagram of a fault management method according to another embodiment of the present application.

FIG. 7 is an interaction diagram of a fault management method according to another embodiment of the present application. The method in FIG. 7 may be executed by the NFV system shown in FIG. 1.

701: A VNFM acquires fault information.

When the VNFM detects that a fault occurs in any VNF entity in the VNF, the VNFM acquires fault information of the faulty VNF entity. Specifically, the acquired fault information may be generated and reported to the VNFM by the faulty VNF entity, or may be generated locally by the VNFM according to a detected fault.

The VNFM may detect, by using the following methods, that a fault occurs in a VNF entity:

For the convenience of description, the following is described by using an example in which a fault occurs in a first VNF entity, where the first VNF entity may be any VNF entity in the VNF, and the entity may include a hardware entity, a software entity, or an instance.

Method 1:

When a fault occurs in the first VNF entity, the first VNF entity generates fault information, where the fault information includes at least a faulty entity identifier that is used to uniquely identify the first VNF entity, and an actual position of the faulty first VNF entity or a position of the faulty first VNF entity in a topology relationship may be determined uniquely by using the identifier. The fault identifier is used to uniquely identify fault information. The fault information further includes a fault type, used to represent a cause of the fault, for example, overload, power-off, memory leakage, port error, or no fault. In addition, the fault information may further include a running state and fault time, where the running state is used to mark whether the first VNF entity currently can work normally, and the fault time may be used to record a time when the fault occurs. As an example, a format of the fault information may be shown in Table 3:

TABLE 3

| Fault information | | | | | |
|---|---|---|---|---|---|
| Fault identifier | Faulty entity identifier | Fault type | Running state | Fault time | Others |
| Uniquely identify fault information | ID of a VNF entity | Overload/ power-off/ no fault . . . | Normal/ faulty . . . | Time | |

After generating the fault information in the foregoing format, the first VNF may send the fault information to the VNFM by using a Ve-Vnfm interface, and optionally, the first NFVI may also send, by using a vEMS, the fault information to an OSS/BSS for management, recording, and presentation.

Method 2:

The VNFM may send an indication message to the first VNF entity periodically or when required, to instruct the first VNF entity to perform fault detection. If the first VNF entity detects a fault, the first VNF entity may return fault information similar to that in Table 3 to the VNFM; or if the first VNF is not faulty, the first VNF entity may return no message, or may return fault information, in which a fault type is "No fault" and a running state is "Normal", shown in Table 3.

Method 3:

The first VNF entity may periodically send a heartbeat indication message indicating that the first VNF entity runs normally to the VNFM. The VNFM periodically receives heartbeats of the first VNF entity, and senses that the first VNF entity works normally. When the heartbeats of the first VNF entity are interrupted, the VNFM determines that a fault occurs in the first VNF entity, and the VNFM may generate fault information of the first VNF. A specific format of the fault information is similar to that of the fault information in Table 3, and no further details are described herein again.

When the VNF entity cannot report fault information due to an unexpected event, the VNFM can still sense immediately that a fault occurs in the first VNF entity.

Method 4:

The VNFM may perform fault detection on the VNF periodically or when required, and then, the VNFM generates fault information of the first VNF according to a fault detection result. A specific format of the fault information is similar to that of the fault information in Table 3, and no further details are described herein again.

In conclusion, the VNFM may detect the fault of the VNF entity by using any one of the foregoing methods, and certainly, may perform detection by combining multiple methods, for example, combining Method 1 and Method 3. The VNF entity sends heartbeats to the VNFM periodically, and when a fault occurs, sends the fault information to the VNFM. If the VNF entity cannot report the fault information due to a catastrophic fault, the VNFM may sense, according to stopping of the heartbeats, that a fault occurs in the VNF entity.

702: The VNFM generates comprehensive fault information.

After the VNFM receives the fault information sent by the first VNF entity, or the VNFM generates the fault information according to the fault of the first VNF entity, the VNFM may generate the comprehensive fault information according to the fault information of the first VNF. Optionally, the VNFM may collect fault information of other VNF entities correlated with the first VNF entity, to generate comprehensive fault information, so as to perform comprehensive processing.

Specifically, because a correlation exists between the VNF entities, when a fault occurs in the first VNF entity, a fault may also occur in another VNF entity correlated with the first VNF entity. FIG. 6b exemplarily shows the correlation between the VNF entities. For example, the VNF1 and the VNF2 are both based on the VM1, that is, a correlation exists between the VNF1 and the VNF2. When a fault occurs in the VNF1, a fault may also occur in the VNF2.

In this case, the VNFM may collect fault information reported by the VNF1, and generate the comprehensive fault information with reference to fault information of the VNF2. Specifically, comprehensive fault information shown in Table 4 may be generated.

TABLE 4

| Comprehensive fault information | | | |
|---|---|---|---|
| Identifier of comprehensive fault information | State information of VNF | Fault state | Others |
| Uniquely identify comprehensive fault information | VNF1, VNF2 | Not processed yet/being processed/repaired/not repaired yet . . . | |

Formats of fault information of the VNF1 and VNF2 entities are similar to that of Table 3. It should be understood that, the comprehensive fault information shown in Table 4 is a specific example, and fault information of entities that is specifically included in the comprehensive fault information is determined according to the correlation. When the comprehensive fault information is just generated, a fault state may be set to "Not processed yet".

703: Perform repeated-alarm detection.

After the VNFM generates the comprehensive fault information, the VNFM may locally detect the generated comprehensive fault information, to determine whether there is same information. Specifically, because after a fault occurs in a VNF entity, all correlated faulty VNF entities may report fault information, and the VNFM may generate multiple pieces of same comprehensive fault information for a same fault. For example, if a fault occurs in the VNF1, a fault also occurs in the VNF2 correlated with the VNF1, and the VNF2 performs a same operation as the VNF1. The VNFM may generate multiple pieces of same comprehensive fault information after collecting correlated fault information, and in this case, the VNFM may process only one piece of comprehensive fault information, and discard the other same comprehensive fault information. It should be understood that, the same comprehensive fault information herein refers to: state information of the VNF is partially the same, and the fault states may be different.

Specifically, the comprehensive fault information may be reserved or discarded according to the fault state in the comprehensive fault information, for example, a fault state in comprehensive fault information that is just generated is "Not processed yet", repeated-alarm detection is performed on the comprehensive fault information, and if same comprehensive fault information in which a fault state is "Being processed" is found, the comprehensive fault information that is not processed yet is discarded.

704: A VNFM performs self-healing determining.

When the VNFM generates the comprehensive fault information, the VNFM may first determine whether a fault type in the comprehensive fault information is a fault type that the VNFM can process.

Specifically, the VNFM has a fault repair policy, where the fault repair policy includes a mapping between a faulty entity identifier, a fault type, and a fault repair method. Whether processing can be performed may be determined by determining whether the fault type in the comprehensive fault information exists in the fault repair policy. For example, a fault type of the VNF1 is "low performance", and a corresponding fault repair method is "adding a VNF instance".

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

705a: The VNFM can perform self-healing processing.

If the VNFM determines that processing can be performed, the VNFM performs fault repair on the VNF entity according to the fault repair method. If the fault repair succeeds, and faults of correlated VNF entities are repaired, an Orchestrator is notified that the repair succeeds, and the fault repair processing process is terminated.

If the comprehensive fault information includes multiple VNF entities, and a fault of a VNF entity that is processed preferentially is repaired successfully, but faults of other correlated VNF entities persist, step 704 is repeated, to determine and repair the remaining faulty VNF entities until faults of all VNF entities in the comprehensive fault information are repaired. Then, the Orchestrator is notified that the repair succeeds, and the fault repair processing process is terminated.

Specifically, for the comprehensive fault information that can be processed, the VNFM may set a repair state to "Being processed", so as to avoid repeated processing on same comprehensive fault information that is generated subsequently and in which a state is "Not processed yet".

The VNF entity that is repaired successfully may notify, by reporting fault information in which a running state is "Normal" and that is similar to the fault information in Table 3, the VNFM that the fault repair succeeds. When faults of all correlated VNF entities in the comprehensive fault information are repaired, the VNFM may set a fault state in the comprehensive fault information to "Repaired", and report the comprehensive fault information to the Orchestrator by using an Or-Vnfm interface. It should be understood that, repair success may also be reported by using predefined signaling, which is not limited in the present application.

In addition, the VNF entity that is being repaired may be isolated, to avoid further fault infection that is caused by interaction between the faulty entity and another adjacent entity.

705b: The VNFM cannot perform self-healing processing.

If the fault repair policy in the VNFM does not include a fault type of a to-be-repaired VNF entity, the VNFM may set the fault state in the comprehensive fault information to "Not repaired yet", and report the comprehensive fault information to the Orchestrator by using an Or-Vnfm interface.

706: The Orchestrator performs self-healing determining.

When the Orchestrator receives the comprehensive fault information sent by the VNFM, the Orchestrator detects whether self-healing processing can be performed, which is similar to self-healing determining of the VNFM. The Orchestrator queries a local fault repair policy, and if the processing can be performed and the repair succeeds, the orchestrator sets the fault state in the comprehensive fault information to "Repaired", and reports the comprehensive fault information to the OSS/BSS; or if the Orchestrator cannot perform repair processing, or can perform repair processing but the repair fails, the orchestrator sets the fault state in the comprehensive fault information of the VNF to "Not repaired yet", and reports the comprehensive fault information to the OSS/BSS. It should be understood that because the Orchestrator is responsible for orchestrating and managing resources, and implementing an NFV service, the Orchestrator has relatively high administration permission and processing capabilities, and can repair most faults. Only a very small quantity of faults that cannot be processed or whose repair fails are reported to the OSS/BSS.

707: An OSS/BSS performs fault repair.

The OSS/BSS sets a fault state in the received comprehensive fault information to "Being processed". Then, the OSS/BSS performs fault repair according to a method in the fault repair policy. After the fault is recovered, the OSS/BSS may receive a fault recovery notification sent by a VNF entity, and then the OSS/BSS modifies the fault state in the comprehensive fault information to "Repaired". The fault repair policy in the OSS/BSS includes processing methods of all fault types by default.

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

According to the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, same comprehensive fault information is deleted by means of repeated-alarm detection, and a faulty entity that is being processed is isolated, the fault processing efficiency and accuracy are improved and fault infection is effectively prevented.

Figure 8:
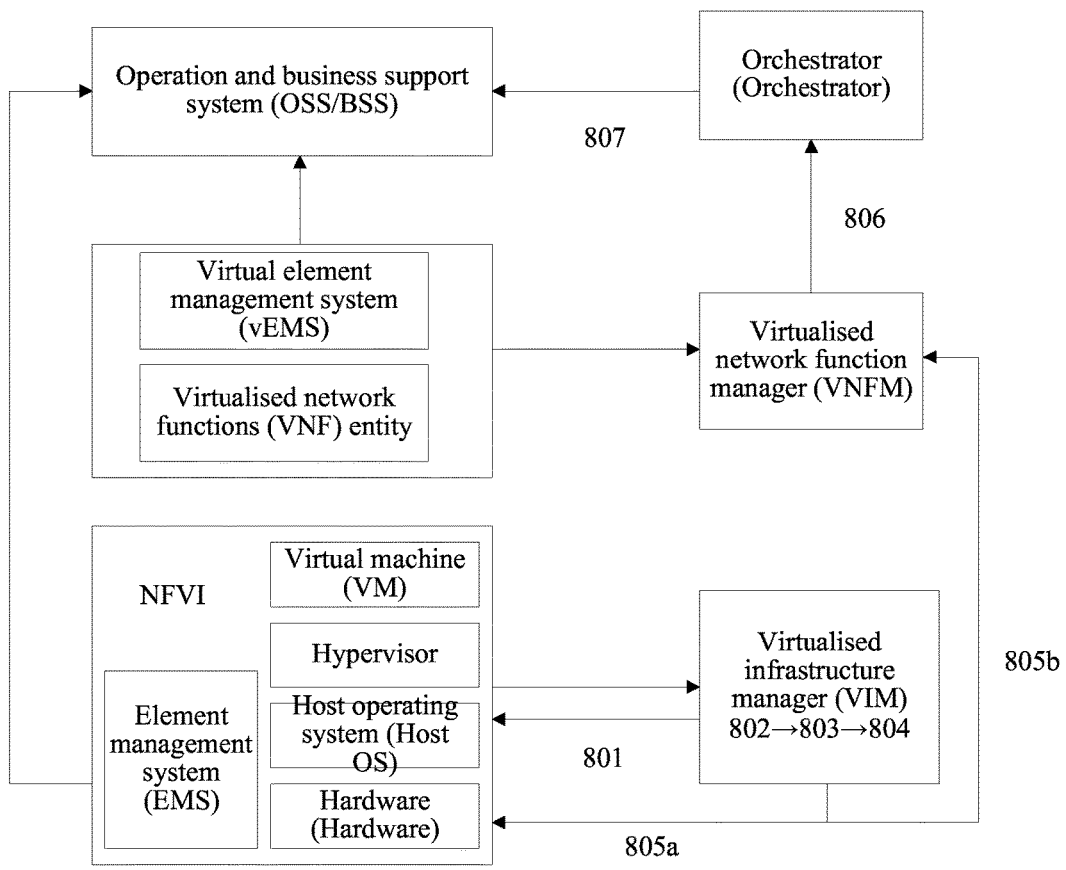
FIG. 8 is an interaction diagram of a fault management method according to another embodiment of the present application.

FIG. 8 is an interaction diagram of a fault management method according to another embodiment of the present application. The method in FIG. 8 may be executed by the NFV system shown in FIG. 1.

801: A VIM acquires fault information.

When the VIM detects that a fault occurs in any HW, Host OS, Hypervisor, or VM entity in an NFVI, the VIM acquires fault information of the faulty NFVI entity. Specifically, the acquired fault information may be generated and reported to the VIM by the faulty NFVI entity, or may be generated locally by the VIM according to a detected fault. Specifically, the method of detecting, by the VIM, that a fault occurs in the NFVI entity is similar to the method described in step 601 in FIG. 6, and no further details are described herein again.

802: The VIM generates comprehensive fault information.

After the VIM receives fault information sent by a first NFVI entity, or the VIM generates fault information according to a fault of the first NFVI entity, the VIM needs to collect fault information of another NFVI entity correlated with the first NFVI entity, to generate comprehensive fault information, so as to perform comprehensive processing, which is specifically similar to the method described in step 602 in FIG. 6, and no further details are described herein again.

803: Perform repeated-alarm detection.

After generating the comprehensive fault information, the VIM may locally detect the generated comprehensive fault information, to determine whether there is same information. A specific detection method is similar to the method described in step 603 in FIG. 6, and no further details are described herein again.

804: The VIM performs self-healing determining.

When the VIM generates the comprehensive fault information, the VIM may first determine whether a fault type in the comprehensive fault information is a fault type that the VIM can process. A specific determining method is similar to the method described in step 604 in FIG. 6, and no further details are described herein again.

805a: The VIM can perform self-healing processing.

If the VIM determines that processing can be performed, the VIM performs fault repair on the NFVI entity according to the fault repair method. If the fault repair succeeds, and faults of correlated NFVI entities are repaired, an Orchestrator is notified that the repair succeeds, and the fault repair processing process is terminated.

If the comprehensive fault information includes multiple NFVI entities, and a fault of an NFVI entity that is processed preferentially is repaired successfully, but faults of other correlated NFVI entities persist, step 804 is repeated, to determine and repair an NFVI entity having a highest priority in the remaining faulty NFVI entities until faults of all NFVI entities in the comprehensive fault information are repaired. Then, the Orchestrator is notified that the repair succeeds, and the fault repair processing process is terminated. A specific method is similar to the method described in step 605a in FIG. 6, and no further details are described herein again.

In addition, the NFVI entity that is being repaired may be isolated, to avoid further fault infection that is caused by interaction between the faulty entity and another adjacent entity.

805b: If the VIM cannot perform self-healing processing, the VIM performs reporting to a VNFM.

If the fault repair policy in the VIM does not include a fault type of a to-be-repaired NFVI entity, the VIM may set the fault state in the comprehensive fault information to "Not repaired yet", and report the comprehensive fault information to the VNFM by using a Vi-Vnfm interface.

When the VNFM receives the comprehensive fault information sent by the VIM, the VNFM detects whether self-healing processing can be performed, which is similar to self-healing determining of the VIM. The VNFM queries a local fault repair policy, and if the processing can be performed and the repair succeeds, the VNFM sets the fault state in the comprehensive fault information to "Repaired", and reports the comprehensive fault information to the Orchestrator; or if the VNFM cannot perform repair processing, or can perform repair processing but the repair fails, the VNFM sets the fault state in the comprehensive fault information of the NFVI to "Not repaired yet", and reports the comprehensive fault information to the Orchestrator.

806: An Orchestrator performs self-healing determining.

When the Orchestrator receives the comprehensive fault information of the NFVI sent by the VNFM, the Orchestrator detects whether self-healing processing can be performed, which is similar to self-healing determining of the VIM. The Orchestrator queries a local fault repair policy, and if the processing can be performed and the repair succeeds, the orchestrator sets the fault state in the comprehensive fault information to "Repaired", and reports the comprehensive fault information to an OSS/BSS; or if the Orchestrator cannot perform repair processing, or can perform repair processing but the repair fails, the orchestrator sets the fault state in the comprehensive fault information of the NFVI to "Not repaired yet", and reports the comprehensive fault information to an OSS/BSS. It should be understood that because the Orchestrator is responsible for orchestrating and managing resources, and implementing an NFV service, the Orchestrator has relatively high administration permission and processing capabilities, and can repair most faults. Only a very small quantity of faults that cannot be processed or whose repair fails are reported to the OSS/BSS.

807: An OSS/BSS performs fault repair.

The OSS/BSS sets a fault state in the received comprehensive fault information to "Being processed". Then, the OSS/BSS performs fault repair according to a method in the fault repair policy. After the fault is recovered, the OSS/BSS may receive a fault recovery notification sent by an NFVI entity, and then the OSS/BSS modifies the fault state in the comprehensive fault information to "Repaired". The fault repair policy in the OSS/BSS includes processing methods of all fault types by default.

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

According to the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, same comprehensive fault information is deleted by means of repeated-alarm detection, and a faulty entity that is being processed is isolated, the fault processing efficiency and accuracy are improved and fault infection is effectively prevented.

Figure 9:
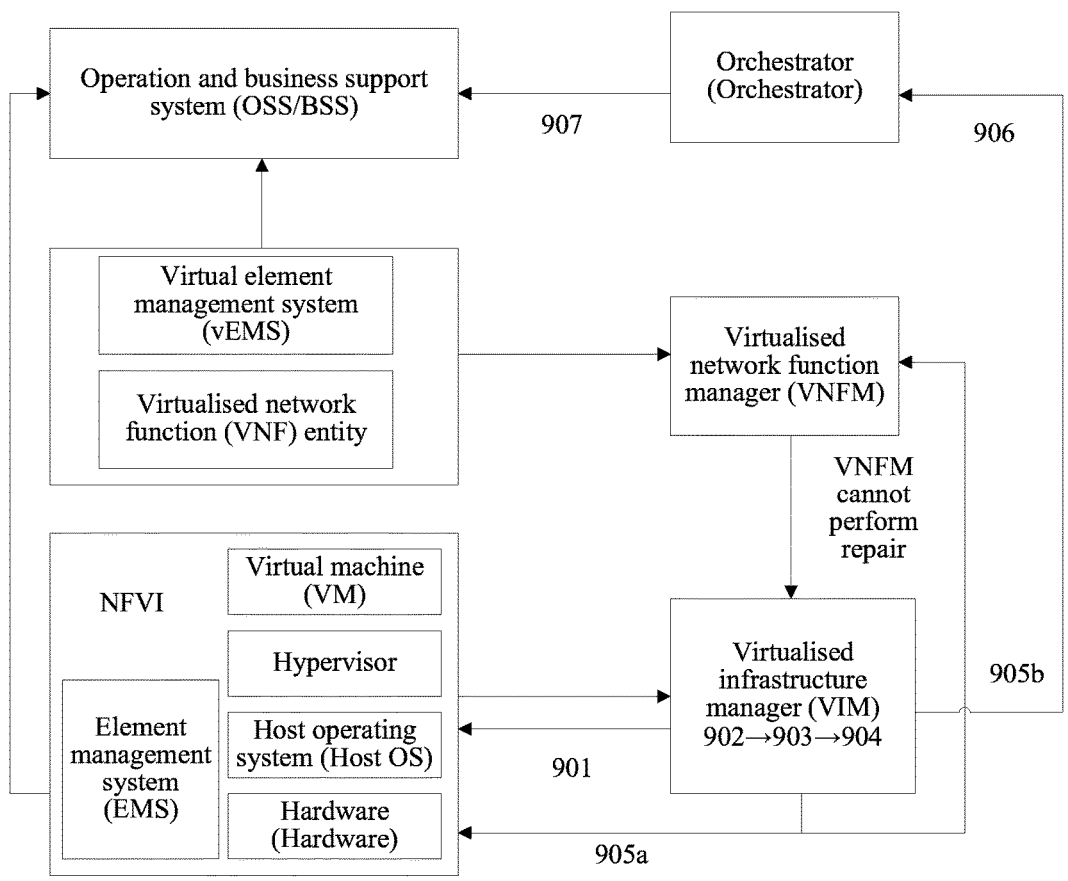
FIG. 9 is an interaction diagram of a fault management method according to another embodiment of the present application.

FIG. 9 is an interaction diagram of a fault management method according to another embodiment of the present application. The method in FIG. 9 may be executed by the NFV system shown in FIG. 1.

901: A VIM acquires fault information.

When the VIM detects that a fault occurs in any HW, Host OS, Hypervisor, or VM in an NFVI, the VIM acquires fault information of the faulty NFVI entity. Specifically, the acquired fault information may be generated and reported to the VIM by the faulty NFVI entity, or may be generated locally by the VIM according to a detected fault. Specifically, the method of detecting, by the VIM, that a fault occurs in the NFVI entity is similar to the method described in step 601 in FIG. 6, and no further details are described herein again.

902: The VIM generates comprehensive fault information.

After the VIM receives fault information sent by a first NFVI entity, or the VIM generates fault information according to a fault of the first NFVI entity, the VIM needs to collect fault information of another NFVI entity correlated with the first NFVI entity, to generate comprehensive fault information, so as to perform comprehensive processing, which is specifically similar to the method described in step 602 in FIG. 6, and no further details are described herein again.

903: Perform repeated-alarm detection.

After generating the comprehensive fault information, the VIM may locally detect the generated comprehensive fault information, to determine whether there is same information. A specific detection method is similar to the method described in step 603 in FIG. 6, and no further details are described herein again.

904: The VIM performs self-healing determining.

When the VIM generates the comprehensive fault information, the VIM may first determine whether a fault type in the comprehensive fault information is a fault type that the VIM can process. A specific determining method is similar to the method described in step 604 in FIG. 6, and no further details are described herein again.

905a: The VIM can perform self-healing processing.

If the VIM determines that processing can be performed, the VIM performs fault repair on the NFVI entity according to the fault repair method. If the fault repair succeeds, and faults of correlated NFVI entities are repaired, an Orchestrator is notified that the repair succeeds, and the fault repair processing process is terminated.

If the comprehensive fault information includes multiple NFVI entities, and a fault of an NFVI entity that is processed preferentially is repaired successfully, but faults of other correlated NFVI entities persist, step 904 is repeated, to determine and repair an NFVI entity having a highest priority in the remaining faulty NFVI entities until faults of all NFVI entities in the comprehensive fault information are repaired. Then, the Orchestrator is notified that the repair succeeds, and the fault repair processing process is terminated. A specific method is similar to the method described in step 605a in FIG. 6, and no further details are described herein again.

In addition, the NFVI entity that is being repaired may be isolated, to avoid further fault infection that is caused by interaction between the faulty entity and another adjacent entity.

905b: If the VIM cannot perform self-healing processing, the VIM performs reporting to a VNFM.

If the fault repair policy in the VIM does not include a fault type of a to-be-repaired NFVI entity, the VIM may set a fault state in the comprehensive fault information to "Not repaired yet", and report the comprehensive fault information to the VNFM by using a Vi-Vnfm interface.

When the VNFM receives the comprehensive fault information sent by the VIM, the VNFM detects whether self-healing processing can be performed, which is similar to self-healing determining of the VIM. The VNFM queries a local fault repair policy, and if the processing can be performed and the repair succeeds, the VNFM sets the fault state in the comprehensive fault information to "Repaired", and reports the comprehensive fault information to the Orchestrator; or if the VNFM cannot perform repair processing, or can perform repair processing but the repair fails, the VNFM sets the fault state in the comprehensive fault information of the NFVI to "Not repaired yet", and returns the comprehensive fault information to the VIM.

906: An Orchestrator performs self-healing determining.

Then, the VIM reports the comprehensive fault information of the NFVI to the Orchestrator by using an Or-Vi interface, and the Orchestrator detects whether self-healing processing can be performed, which is similar to self-healing determining of the VIM. The Orchestrator queries a local fault repair policy, and if the processing can be performed and the repair succeeds, the orchestrator sets the fault state in the comprehensive fault information to "Repaired", and reports the comprehensive fault information to an OSS/BSS; or if the Orchestrator cannot perform repair processing, or can perform repair processing but the repair fails, the orchestrator sets the fault state in the comprehensive fault information to "Not repaired yet", and reports the comprehensive fault information to an OSS/BSS. It should be understood that because the Orchestrator is responsible for orchestrating and managing resources, and implementing an NFV service, the Orchestrator has relatively high administration permission and processing capabilities, and can repair most faults. Only a very small quantity of faults that cannot be processed or whose repair fails are reported to the OSS/BSS.

907: An OSS/BSS performs fault repair.

The OSS/BSS sets a fault state in the received comprehensive fault information to "Being processed". Then, the OSS/BSS performs fault repair according to a method in the fault repair policy. After the fault is recovered, the OSS/BSS may receive a fault recovery notification sent by an NFVI entity, and then the OSS/BSS modifies the fault state in the comprehensive fault information to "Repaired". The fault repair policy in the OSS/BSS includes processing methods of all fault types by default.

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

It should be understood that, FIG. 6, FIG. 8, and FIG. 9 are processes of repairing and managing a fault of an NFVI entity by a VIM, and FIG. 7 is a process of repairing and managing a fault of a VNF entity by a VNFM. The processing of repairing and managing an NFVI entity by a VIM and a process of repairing and managing a VNF entity by a VNFM may be two relatively separate processes, or may also be two simultaneous processes, which is not limited in the present application.

According to the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, same comprehensive fault information is deleted by means of repeated-alarm detection, and a faulty entity that is being processed is isolated, the fault processing efficiency and accuracy are improved and fault infection is effectively prevented.

Figure 10:
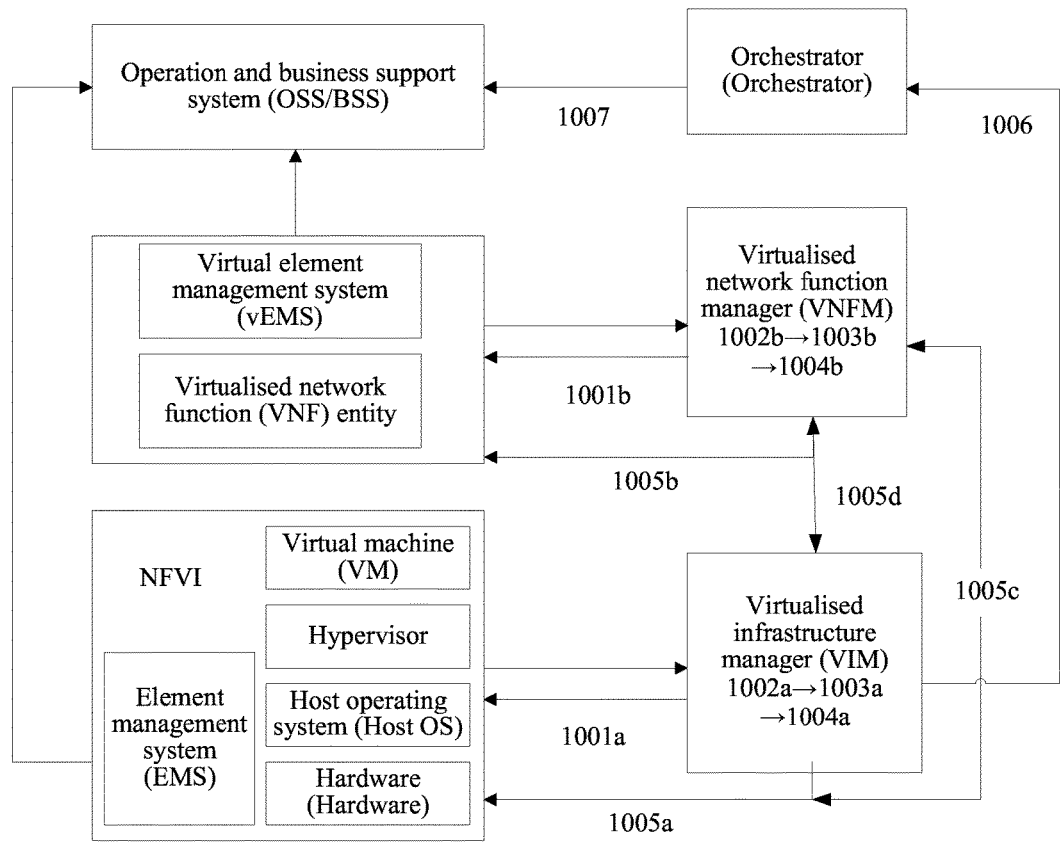
FIG. 10 is an interaction diagram of a fault management method according to another embodiment of the present application.

FIG. 10 is an interaction diagram of a fault management method according to another embodiment of the present application. The method in FIG. 10 may be executed by the NFV system shown in FIG. 1.

1001a: A VIM acquires fault information.

When the VIM detects that a fault occurs in any HW, Host OS, Hypervisor, or VM in an NFVI, the VIM acquires fault information of the faulty NFVI entity. Specifically, the acquired fault information may be generated and reported to the VIM by the faulty NFVI entity, or may be generated locally by the VIM according to a detected fault.

The VIM may detect, by using the following methods, that a fault occurs in an NFVI entity:

For the convenience of description, the following is described by using an example in which a fault occurs in a first NFVI entity, where the first NFVI entity may be any HW, Host OS, Hypervisor, or VM in the NFVI, and the entity may include a hardware entity or a software entity.

Method 1:

When a fault occurs in the first NFVI entity, the first NFVI entity generates fault information, where the fault information includes at least a faulty entity identifier that is used to uniquely identify the first NFVI entity, and an actual position of the faulty first NFVI entity or a position of the faulty first NFVI entity in a topology relationship may be determined uniquely by using the identifier. The fault information further includes a fault identifier, used to uniquely identify fault information. The fault information further includes a fault type, used to represent a cause of the fault, for example, power-off, overload, or no fault. In addition, the fault information may further include a running state and fault time, where the running state is used to mark whether the first NFVI entity currently can work normally, and the fault time may be used to record a time when the fault occurs. As an example, a format of the fault information may be shown in Table 1.

After generating the fault information in the foregoing format, the first NFVI may send the fault information to the VIM by using an Nf-Vi interface, and optionally, the first NFVI may also send, by using an EMS, the fault information to an OSS/BSS for management, recording, and presentation.

Method 2:

The VIM may send an indication message to the first NFVI entity periodically or when required, to instruct the first NFVI entity to perform fault detection. If the first NFVI entity detects a fault, the first NFVI entity may return fault information similar to that in Table 1 to the VIM; or if the first NFVI is not faulty, the first NFVI entity may return no message, or may return fault information, in which a fault type is "No fault" and a running state is "Normal", shown in Table 1.

Method 3:

The first NFVI entity may periodically send a heartbeat indication message indicating that the first NFVI entity runs normally to the VIM. The VIM periodically receives heartbeats of the first NFVI entity, and senses that the first NFVI entity works normally. When the heartbeats of the first NFVI entity are interrupted, the VIM determines that a fault occurs in the first NFVI entity, and the VIM may generate fault information of the first NFVI. A specific format of the fault information is similar to that of the fault information in Table 1, and no further details are described herein again. When the NFVI entity cannot report fault information due to an unexpected event such as power-off, the VIM can still sense immediately that a fault occurs in the first NFVI entity.

Method 4:

The VIM may perform fault detection on the NFVI periodically or when required, and then, the VIM generates fault information of the first NFVI according to a fault detection result. A specific format of the fault information is similar to that of the fault information in Table 1, and no further details are described herein again.

In conclusion, the VIM may detect the fault of the NFVI entity by using any one of the foregoing methods, and certainly, may perform detection by combining multiple methods, for example, combining Method 1 and Method 3. The NFVI entity sends heartbeats to the VIM periodically, and when a fault occurs, sends fault information to the VIM. If the NFVI entity cannot report the fault information due to a catastrophic fault, the VIM may sense, according to stopping of the heartbeats, that a fault occurs in the NFVI entity.

1001b: A VNFM acquires fault information.

When the VNFM detects that a fault occurs in any VNF entity in the VNF, the VNFM acquires fault information of the faulty VNF entity. Specifically, the acquired fault information may be generated and reported to the VNFM by the faulty VNF entity, or may be generated locally by the VNFM according to a detected fault.

The VNFM may detect, by using the following methods, that a fault occurs in a VNF entity:

For the convenience of description, the following is described by using an example in which a fault occurs in a first VNF entity, where the first VNF entity may be any VNF entity in the VNF, and the entity may include a hardware entity, a software entity, or an instance.

Method 1:

When a fault occurs in the first VNF entity, the first VNF entity generates fault information, where the fault information includes at least a faulty entity identifier that is used to uniquely identify the first VNF entity, and an actual position of the faulty first VNF entity or a position of the faulty first VNF entity in a topology relationship may be determined uniquely by using the identifier. The fault information may further include a fault type, used to represent a cause or result of the fault. In addition, the fault information may further include a running state and fault time, where the running state is used to mark whether the first VNF entity currently can work normally, and the fault time may be used to record a time when the fault occurs. As an example, a format of the fault information may be shown in Table 3.

After generating the fault information in the foregoing format, the first VNF may send the fault information to the VNFM by using a Ve-Vnfm interface, and optionally, the first VNF may also send, by using a vEMS, the fault information to the OSS/BSS for management, recording, and presentation.

Method 2:

The VNFM may send an indication message to the first VNF entity periodically or when required, to instruct the first VNF entity to perform fault detection. If the first VNF entity detects a fault, the first VNF entity may return fault information similar to that in Table 3 to the VNFM; or if the first VNF is not faulty, the first VNF entity may return no message, or may return fault information, in which a fault type is "No fault" and a running state is "Normal", shown in Table 3.

Method 3:

The first VNF entity may periodically send a heartbeat indication message indicating that the first VNF entity runs normally to the VNFM. The VNFM periodically receives heartbeats of the first VNF entity, and senses that the first VNF entity works normally. When the heartbeats of the first VNF entity are interrupted, the VNFM determines that a fault occurs in the first VNF entity, and the VNFM may generate fault information of the first VNF. A specific format of the fault information is similar to that of the fault information in Table 3, and no further details are described herein again.

When the VNF entity cannot report fault information due to an unexpected event, the VNFM can still sense immediately that a fault occurs in the first VNF entity.

Method 4:

The VNFM may perform fault detection on the VNF periodically or when required, and then, the VNFM generates fault information of the first VNF according to a fault detection result. A specific format of the fault information is similar to that of the fault information in Table 3, and no further details are described herein again.

In conclusion, the VNFM may detect the fault of the VNF entity by using any one of the foregoing methods, and certainly, may perform detection by combining multiple methods, for example, combining Method 1 and Method 3. The VNF entity sends heartbeats to the VNFM periodically, and when a fault occurs, sends the fault information to the VNFM. If the VNF entity cannot report the fault information due to a catastrophic fault, the VNFM may sense, according to stopping of the heartbeats, that a fault occurs in the VNF entity.

It should be understood that step 1001a and step 1001b may be two relatively separate processes, or may be two related processes. In this embodiment of the present application, the two steps may be understood as two simultaneous processes, that is, this embodiment of the present application specifically describes fault management and repair in a case in which correlated faults occur in the NFVI and the VNF.

1002a: The VIM generates comprehensive fault information.

After the VIM receives the fault information sent by the first NFVI entity, or the VIM generates fault information according to a fault of the first NFVI entity, that is, after step 1001a, the VIM needs to collect fault information of another NFVI entity correlated with the first NFVI entity, to generate comprehensive fault information, so as to perform comprehensive processing.

Specifically, because a correlation exists between HW, Host OS, Hypervisor, and VM entities, when a fault occurs in the first NFVI entity, a fault may also occur in an entity correlated with the first NFVI entity. FIG. 6b exemplarily shows the correlation between the HW, Host OS, Hypervisor, and VM entities. For example, a Host OS1, a Hypervisor1, a VM1, and a VM2 are correlated with the HW1. That means, when a fault occurs in the HW1, faults may also occur in virtualized entities established on the HW1: the Host OS1, the Hypervisor1, the VM1, and the VM2.

In this case, the VIM may collect fault information reported by the Host OS1, the Hypervisor1, the VM1, and the VM2, and generate comprehensive fault information with reference to fault information of the HW1. Specifically, the comprehensive fault information shown in Table 2 may be generated, where formats of fault information of the HW, Host OS, Hypervisor, and VM entities are similar to that in Table 1. It should be understood that, the comprehensive fault information shown in Table 2 is a specific example, and fault information of entities that is specifically included in the comprehensive fault information is determined according to the correlation. When the comprehensive fault information is just generated, a fault state may be set to "Not processed yet".

1002b: The VNFM generates comprehensive fault information.

After the VNFM receives the fault information sent by the first VNF entity, or the VNFM generates the fault information according to the fault of the first VNF entity, that is, after step 1001b, the VNFM may generate the comprehensive fault information according to the fault information of the first VNF. Optionally, the VNFM may collect fault information of other VNF entities correlated with the first VNF entity, to generate comprehensive fault information, so as to perform comprehensive processing.

Specifically, because a correlation exists between the VNF entities, when a fault occurs in the first VNF entity, a fault may also occur in another VNF entity correlated with the first VNF entity. FIG. 7b exemplarily shows the correlation between the VNF entities. For example, the VNF1 and the VNF2 are both based on the VM1, that is, a correlation exists between the VNF1 and the VNF2. When a fault occurs in the VNF1, a fault may also occur in the VNF2.

In this case, the VNFM may collect fault information reported by the VNF1, and generate the comprehensive fault information with reference to fault information of the VNF2. Specifically, comprehensive fault information shown in Table 4 may be generated.

Formats of fault information of the VNF1 and VNF2 entities are similar to that of Table 3. It should be understood that, the comprehensive fault information shown in Table 4 is a specific example, and fault information of entities that is specifically included in the comprehensive fault information is determined according to the correlation. When the comprehensive fault information is just generated, a fault state may be set to "Not processed yet".

Likewise, step 1002a and step 1002b may be two relatively separate processes, or may be two related processes. In this embodiment of the present application, the two steps may be understood as two simultaneous processes.

1003a: The VIM performs repeated-alarm detection.

After generating the comprehensive fault information, the VIM may locally detect the generated comprehensive fault information, to determine whether there is same information. Specifically, because after a fault occurs in an NFVI entity, all correlated faulty NFVI entities may report fault information, and the VIM may generate multiple pieces of same comprehensive fault information for a same fault. For example, if a fault occurs in the HW1, faults also occur in the Host OS1, Hypervisor1, VM1, and VM2 correlated with the HW1, and the Host OS1, Hypervisor1, VM1, and VM2 correlated with the HW1 perform a same operation as the HW1. The VIM may generate multiple pieces of same comprehensive fault information after collecting correlated fault information, and in this case, the VIM may process only one piece of comprehensive fault information, and discard the other same comprehensive fault information. It should be understood that, the same comprehensive fault information refers to: the fault information of the HW, Host OS, Hypervisor, and VM are partially the same, and fault states may be different.

Specifically, the comprehensive fault information may be reserved or discarded according to the fault state in the comprehensive fault information, for example, a fault state in comprehensive fault information that is just generated is "Not processed yet", repeated-alarm detection is performed on the comprehensive fault information, and if same comprehensive fault information in which a fault state is "Being processed" is found, the comprehensive fault information that is not processed yet is discarded, and comprehensive fault information in which a fault state is "Being processed" is reserved and processed.

1003b: The VNFM performs repeated-alarm detection.

After generating the comprehensive fault information, the VNFM may locally detect the generated comprehensive fault information, to determine whether there is same information. Specifically, because after a fault occurs in a VNF entity, all correlated faulty VNF entities may report fault information, and the VNFM may generate multiple pieces of same comprehensive fault information for a same fault. For example, if a fault occurs in the VNF1, a fault also occurs in the VNF2 correlated with the VNF1, and the VNF2 performs a same operation as the VNF1. The VNFM may generate multiple pieces of same comprehensive fault information after collecting correlated fault information, and in this case, the VNFM may process only one piece of comprehensive fault information, and discard the other same comprehensive fault information. It should be understood that, the same comprehensive fault information herein refers to: state information of the VNF is partially the same, and the fault states may be different.

Specifically, the comprehensive fault information may be reserved or discarded according to the fault state in the comprehensive fault information, for example, a fault state in comprehensive fault information that is just generated is "Not processed yet", repeated-alarm detection is performed on the comprehensive fault information, and if same comprehensive fault information in which a fault state is "Being processed" is found, the comprehensive fault information that is not processed yet is discarded, and comprehensive fault information in which a fault state is "Being processed" is reserved and processed.

1004a: The VIM performs self-healing determining.

When the VIM generates the comprehensive fault information, the VIM may first determine whether a fault type in the comprehensive fault information is a fault type that the VIM can process.

Specifically, the VIM has a fault repair policy, where the fault repair policy includes a mapping between a faulty entity identifier, a fault type, and a fault repair method. Whether processing can be performed may be determined by determining whether the fault type in the comprehensive fault information exists in the fault repair policy. For example, a fault type of HW1 is "low performance", and a corresponding fault repair method is "restart".

In addition, when the comprehensive fault information includes fault information of multiple correlated NFVI entities, the VIM may determine, according to priorities of the NFVI entities, to perform self-healing determining on a fault type in fault information of an NFVI entity. The priorities are: HW>Host OS>Hypervisor>VM. For example, as shown in Table 2, when the comprehensive fault information includes fault information of the HW1, the Host OS1, the Hypervisor1, the VM1, and the VM2, the VIM may process a fault of the HW1 preferentially, that is, determine, according to a fault type in fault information of the HW1 such as "low performance", that a fault repair method is "restart".

1004b: The VNFM performs self-healing determining.

When the VNFM generates the comprehensive fault information, the VNFM may first determine whether a fault type in the comprehensive fault information is a fault type that the VNFM can process.

Specifically, the VNFM has a fault repair policy, where the fault repair policy includes a mapping between a faulty entity identifier, a fault type, and a fault repair method. Whether processing can be performed may be determined by determining whether the fault type in the comprehensive fault information exists in the fault repair policy. For example, a fault type of the VNF1 is "low performance", and a corresponding fault repair method is "adding a VNF instance".

Specifically, the fault repair method may include but is not limited to one of the following listed methods: restarting a hardware device, reloading software (a Host OS, a Hypervisor, or the like), migrating a VM, reloading VNF installation software, re-instantiating VNF, adding a VNF instance, migrating VNF (that is, re-allocating resources to the VNF), and re-instantiating a VNF forwarding graph (VNF Forwarding Graph).

1005a: The VIM can perform self-healing processing.

If the VIM determines that processing can be performed, the VIM performs fault repair on the NFVI entity according to the fault repair method. If the fault repair succeeds, and faults of correlated NFVI entities are repaired, an Orchestrator is notified that the repair succeeds, and the fault repair processing process is terminated.

If the comprehensive fault information includes multiple NFVI entities, and a fault of an NFVI entity that is processed preferentially is repaired successfully, but faults of other correlated NFVI entities persist, step 1004a is repeated, to determine and repair an NFVI entity having a highest priority in the remaining faulty NFVI entities until faults of all NFVI entities in the comprehensive fault information are repaired. Then, the Orchestrator is notified that the repair succeeds, and the fault repair processing process is terminated.

Specifically, for the comprehensive fault information that can be processed, the VIM may set a repair state to "Being processed", so as to avoid repeated processing on same comprehensive fault information that is generated subsequently and in which a state is "Not processed yet".

The NFVI entity that is repaired successfully may notify, by reporting fault information in which a running state is "Normal" and that is similar to the fault information in Table 1, the VIM that the fault repair succeeds. When faults of all correlated NFVI entities in the comprehensive fault information are repaired, the VIM may set a fault state in the comprehensive fault information to "Repaired", and report the comprehensive fault information to the Orchestrator by using an Or-Vi interface. It should be understood that, repair success may also be reported by using predefined signaling, which is not limited in the present application.

In addition, the NFVI entity that is being repaired may be isolated, to avoid further fault infection that is caused by interaction between the faulty entity and another adjacent entity.

1005b: The VNFM can perform self-healing processing.

If the VNFM determines that processing can be performed, the VNFM performs fault repair on the VNF entity according to the fault repair method. If the fault repair succeeds, and faults of correlated VNF entities are repaired, the Orchestrator is notified that the repair succeeds, and the fault repair processing process is terminated.

If the comprehensive fault information includes multiple VNF entities, and a fault of a VNF entity that is processed preferentially is repaired successfully, but faults of other correlated VNF entities persist, step 1004b is repeated, to determine and repair the remaining faulty VNF entities until faults of all VNF entities in the comprehensive fault information are repaired. Then, the Orchestrator is notified that the repair succeeds, and the fault repair processing process is terminated.

Specifically, for the comprehensive fault information that can be processed, the VNFM may set a repair state to "Being processed", so as to avoid repeated processing on same comprehensive fault information that is generated subsequently and in which a state is "Not processed yet".

The VNF entity that is repaired successfully may notify, by reporting fault information in which a running state is "Normal" and that is similar to the fault information in Table 3, the VNFM that the fault repair succeeds. When faults of all correlated VNF entities in the comprehensive fault information are repaired, the VNFM may set a fault state in the comprehensive fault information to "Repaired", and report the comprehensive fault information to the Orchestrator by using an Or-Vnfm interface. It should be understood that, repair success may also be reported by using predefined signaling, which is not limited in the present application.

In addition, the VNF entity that is being repaired may be isolated, to avoid further fault infection that is caused by interaction between the faulty entity and another adjacent entity.

1005c: The VIM cannot perform self-healing processing.

After determining in step 1005a, if the fault repair policy in the VIM does not include a fault type of a to-be-repaired NFVI entity, the VIM requests, from the VNFM, fault information of a VNF entity correlated with the first NFVI entity. Then, the VIM receives the fault information, sent by the VNFM, of the VNF entity correlated with the first NFVI entity, adds the received fault information to original comprehensive fault information of the NFVI, and then, reports the combined comprehensive fault information to the Orchestrator by using an Or-Vi interface. For example, in the correlation shown in FIG. 6a, NFVI entities correlated with the HW1 are the Host OS1, the Hypervisor1, the VM1, and the VM2, and the HW1 is further correlated with the VNF, where the VNF1 and the VNF2 are also correlated with the HW1. If a fault occurs in the VNF1, that is, the VNFM has fault information of the VNF1, the VNFM sends the fault information of the VNF1 to the VIM by using a Vi-Vnfm interface, so that the VIM performs comprehensive processing and reporting.

1005d: The VNFM cannot perform self-healing processing.

After determining in step 1005b, if the fault repair policy in the VNFM does not include a fault type of a to-be-repaired VNF entity, the VNFM requests, from the VIM, fault information of an NFVI entity correlated with the first VNF entity. Then, the VNFM receives the fault information, sent by the VIM, of the NFVI entity correlated with the first VNF entity, adds the received fault information to original comprehensive fault information of the VNF, and then, reports the combined comprehensive fault information to the Orchestrator by using an Or-Vnfm interface. For example, in the correlation shown in FIG. 6a, NFVI entities correlated with the VNF1 are the VM1, the Host OS1, the Hypervisor1, the HW1, and the HW2. If faults also occur in the VM1, the Host OS1, the Hypervisor1, and the HW1, the VIM sends fault information of the VM1, the Host 051, the Hypervisor1, and the HW1 to the VNFM by using a Vi-Vnfm interface, so that the VNFM performs comprehensive processing and reporting.

1006: An Orchestrator performs self-healing determining.

When the Orchestrator receives the comprehensive fault information that is reported by the VNFM or the VIM and on which comprehensive processing has been performed (1005c or 1005d), the Orchestrator detects whether self-healing processing can be performed on the comprehensive fault information, which is similar to self-healing determining of the VIM. The Orchestrator searches a local fault repair policy, and if the processing can be performed and the repair succeeds, the orchestrator sets the fault state in the comprehensive fault information to "Repaired", and reports the comprehensive fault information to the OSS/BSS; or if the Orchestrator cannot perform repair processing, or can perform repair processing but the repair fails, the orchestrator sets the fault state in the comprehensive fault information to "Not repaired yet", and reports the comprehensive fault information to the OSS/BSS. It should be understood that because the Orchestrator is responsible for orchestrating and managing resources, and implementing an NFV service, the Orchestrator has relatively high administration permission and processing capabilities, and can repair most faults. Only a very small quantity of faults that cannot be processed or whose repair fails are reported to the OSS/BSS.

1007: An OSS/BSS performs fault repair.

The OSS/BSS sets a fault state in the received comprehensive fault information to "Being processed". Then, the OSS/BSS performs fault repair according to a method in the fault repair policy. After the fault is recovered, the OSS/BSS may receive a fault recovery notification sent by an NFVI entity, and then the OSS/BSS modifies the fault state in the comprehensive fault information to "Repaired". The fault repair policy in the OSS/BSS includes processing methods of all fault types by default.

According to the fault management method provided in this embodiment of the present application, a VIM acquires fault information of a hardware and/or software entity, to perform comprehensive processing on correlated pieces of fault information, which can implement fault reporting and processing in an NFV environment. In addition, because comprehensive processing is performed on correlated pieces of fault information, same comprehensive fault information is deleted by means of repeated-alarm detection, and a faulty entity that is being processed is isolated, the fault processing efficiency and accuracy are improved and fault infection is effectively prevented.

Figure 11:
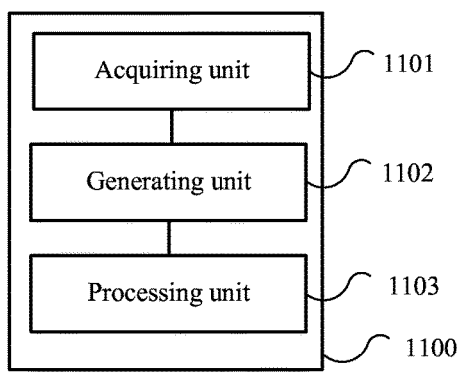
FIG. 11 is a schematic block diagram of a virtualized infrastructure manager (VIM) entity according to an embodiment of the present application.

FIG. 11 is a schematic diagram of a virtualized infrastructure manager (VIM) entity according to an embodiment of the present application. The VIM entity 1100 shown in FIG. 11 includes an acquiring unit 1101, a generating unit 1102, and a processing unit 1103.

The acquiring unit 1101 acquires first fault information, including a faulty entity identifier and a fault type, of a network function virtualization infrastructure (NFVI) entity, where the first fault information is used to indicate that a fault occurs in a first NFVI entity having the faulty entity identifier.

The generating unit 1102 is configured to generate first comprehensive fault information according to the first fault information acquired by the acquiring unit 1101, where the first comprehensive fault information includes the first fault information and correlated fault information of the first fault information.

The processing unit 1103 is configured to perform fault repair or reporting processing according to the first comprehensive fault information generated by the generating unit 1102.

The VIM entity 1100 provided in this embodiment of the present application acquires fault information of a hardware and/or software entity, to perform comprehensive processing on correlated pieces of fault information, which can implement fault reporting and processing in an NFV environment.

Optionally, in an embodiment, the VIM entity 1100 further includes a determining unit and a receiving unit, and the acquiring unit is specifically configured to receive, by using the receiving unit, the first fault information sent by the first NFVI entity; or determine, by using the determining unit, that a fault occurs in the first NFVI entity, and generate the first fault information according to the fault of the first NFVI entity.

Optionally, in an embodiment, the first NFVI entity is any hardware (HW), host operating system (Host OS), virtual machine manager, or virtual machine (VM) entity in the NFVI entity, and the generating unit 1102 is specifically configured to determine that fault information sent by an NFVI entity correlated with the first NFVI entity is the correlated fault information of the first fault information, and generate the first comprehensive fault information that includes the first fault information and the correlated fault information.

Optionally, in an embodiment, the processing unit 1103 includes a sending unit, and the processing unit 1103 is specifically configured to determine, by using the determining unit and according to the fault type in the first fault information in the first comprehensive fault information or a fault type in the correlated fault information in the first comprehensive fault information, whether the VIM entity 1100 includes a fault repair policy that corresponds to the fault type in the first fault information or the fault type in the correlated fault information; and when the VIM entity 1100 includes the fault repair policy that corresponds to the fault type in the first fault information or the fault type in the correlated fault information, repair, according to the fault repair policy, the fault of the first NFVI entity and/or a fault of the NFVI entity correlated with the first NFVI entity; or when the VIM entity 1100 does not include the fault repair policy that corresponds to the fault type in the first fault information or the fault type in the correlated fault information, send, by using the sending unit, the first comprehensive fault information to a VNFM or send the first comprehensive fault information to an orchestrator.

Optionally, in an embodiment, the processing unit 1103 is specifically configured to: determine, by using the determining unit, an NFVI entity having a highest priority from the first NFVI entity and the NFVI entity correlated with the first NFVI entity, where a priority of the HW is higher than a priority of the Host OS, the priority of the Host OS is higher than a priority of the virtual machine manager, and the priority of the virtual machine manager is higher than a priority of the VM; determine, by using the determining unit and according to a fault type in the NFVI entity having a highest priority, whether the VIM entity 1100 includes a corresponding fault repair policy; and when the VIM entity 1100 includes the fault repair policy corresponding to the fault type of the NFVI entity having a highest priority, repair, according to the fault repair policy, a fault of the NFVI entity having a highest priority.

Optionally, in an embodiment, the sending unit is specifically configured to: when the fault repair succeeds, send a success indication message to the orchestrator; or when the fault repair fails, send the first comprehensive fault information to the VNFM or send the first comprehensive fault information to the orchestrator.

Optionally, in an embodiment, the receiving unit is further configured to receive an indication message that is sent by the VNFM and is used to indicate that the VNFM is incapable of processing the first comprehensive fault information, and the sending unit is further configured to send the first comprehensive fault information to the orchestrator.

Optionally, in an embodiment, the processing unit 1103 is further configured to request, from the VNFM, fault information of a VNF entity correlated with the first NFVI entity, and add the fault information of the VNF entity correlated with the first NFVI entity to the first comprehensive fault information.

Optionally, in an embodiment, the receiving unit is further configured to receive request information sent by the VNFM, where the request information is used to request, from the VIM entity 1100, fault information of an NFVI entity correlated with a faulty VNF entity, and the sending unit is further configured to send the fault information of the NFVI entity correlated with the faulty VNF entity to the VNFM.

Optionally, in an embodiment, the VIM entity 1100 further includes a detection unit and a deletion unit, where the detection unit is specifically configured to detect, according to the first comprehensive fault information, whether the VIM entity 1100 includes comprehensive fault information that is the same as the first comprehensive fault information, and the deletion unit is specifically configured to: when the VIM entity 1100 includes the comprehensive fault information that is the same as the first comprehensive fault information, delete the first comprehensive fault information.

The VIM entity 1100 provided in this embodiment of the present application acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 12:
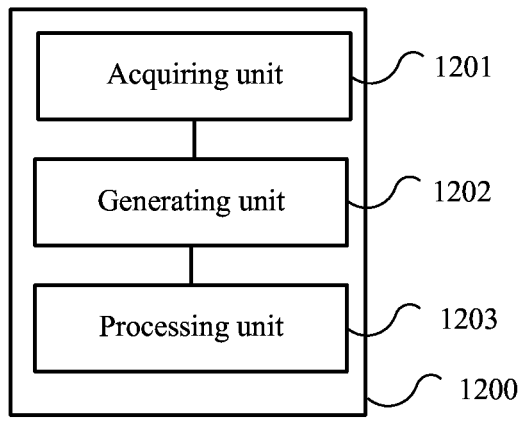
FIG. 12 is a schematic block diagram of a virtualized network function manager (VNFM) entity according to an embodiment of the present application.

FIG. 12 is a schematic diagram of a virtualized network function manager (VNFM) entity according to an embodiment of the present application. The VNFM entity 1200 shown in FIG. 12 includes an acquiring unit 1201, a generating unit 1202, and a processing unit 1203.

The acquiring unit 1201 acquires second fault information, including a faulty entity identifier and a fault type, of a virtualized network function (VNF) entity, where the second fault information is used to indicate that a fault occurs in a first VNF entity having the faulty entity identifier. The generating unit 1202 generates second comprehensive fault information according to the second fault information. The processing unit 1203 performs fault repair or reporting processing according to the second comprehensive fault information.

The VNFM entity 1200 provided in this embodiment of the present application acquires fault information of a hardware and/or software entity, to perform comprehensive processing on correlated pieces of fault information, which can implement fault reporting and processing in an NFV environment.

Optionally, in an embodiment, the VNFM entity 1200 further includes a determining unit and a receiving unit, and the acquiring unit is specifically configured to receive, by using the receiving unit, the second fault information sent by the first VNF entity; or determine, by using the determining unit, that a fault occurs in the first VNF entity, and generate, by using the generating unit, the second fault information according to the fault of the first VNF entity.

Optionally, in an embodiment, the generating unit 1202 is specifically configured to determine, by using the determining unit, that fault information sent by a VNF entity correlated with the first VNF entity is correlated fault information of the second fault information, and generate the second comprehensive fault information that includes the second fault information and the correlated fault information.

Optionally, in an embodiment, the processing unit 1203 includes a sending unit, and the processing unit is specifically configured to determine, by using the determining unit and according to the fault type in the second fault information in the second comprehensive fault information or a fault type in the correlated fault information in the second comprehensive fault information, whether the VNFM entity 1200 includes a fault repair policy that corresponds to the fault type in the second fault information or the fault type in the correlated fault information; and when the VNFM entity 1200 includes the fault repair policy that corresponds to the fault type in the second fault information or the fault type in the correlated fault information, repair, according to the fault repair policy, the fault of the first VNF entity and/or a fault of the VNF entity correlated with the first VNF entity; or when the VNFM entity 1200 does not include the fault repair policy that corresponds to the fault type in the second fault information or the fault type in the correlated fault information, send, by using the sending unit, the second comprehensive fault information to an orchestrator.

Optionally, in an embodiment, the sending unit is specifically configured to: when the fault repair succeeds, send a success indication message to the orchestrator; or when the fault repair fails, send the second comprehensive fault information to the orchestrator.

Optionally, in an embodiment, the processing unit 1203 is further configured to request, from a virtualized infrastructure manager (VIM), fault information of an NFVI entity correlated with the first VNF entity, where the NFVI entity is any hardware (HW), host operating system (Host OS), virtual machine manager, or virtual machine (VM) entity in the NFVI; and add the fault information of the NFVI entity correlated with the first VNF entity to the second comprehensive fault information.

Optionally, in an embodiment, the processing unit 1203 is further configured to receive first comprehensive fault information sent by the VIM, where the first comprehensive fault information includes first fault information and correlated fault information of the first fault information, and the first fault information is used to indicate that a fault occurs in a first NFVI entity; determine whether the VNFM entity 1200 includes a fault repair policy that corresponds to a fault type in the first fault information in the first comprehensive fault information or a fault type in the correlated fault information in the first comprehensive fault information; and when the VNFM entity 1200 includes the fault repair policy that corresponds to the fault type in the first fault information or the fault type in the correlated fault information, repair, according to the fault repair policy, the fault of the first NFVI entity and/or a fault of the NFVI entity correlated with the first NFVI entity; or when the VNFM entity 1200 does not include the fault repair policy that corresponds to the fault type in the first fault information or the fault type in the correlated fault information, send the first comprehensive fault information to the orchestrator, or send an indication message used to indicate that the VNFM entity 1200 is incapable of processing the first comprehensive fault information to the VIM, so that the VIM sends the first comprehensive fault information to the orchestrator.

Optionally, in an embodiment, the processing unit 1203 is further specifically configured to determine, according to the first comprehensive fault information, fault information of a first VNF entity that is correlated with the first NFVI entity and/or is correlated with the NFVI entity correlated with the first NFVI entity, and add the fault information of the first VNF entity to the first comprehensive fault information, so that the VNFM entity 1200 performs repair or reporting processing on the first comprehensive fault information.

Optionally, in an embodiment, the VNFM entity 1200 further includes a detection unit and a deletion unit, where the detection unit is specifically configured to detect, according to the second comprehensive fault information, whether the VNFM entity 1200 includes comprehensive fault information that is the same as the second comprehensive fault information, and the deletion unit is specifically configured to: when the VNFM entity 1200 includes the comprehensive fault information that is the same as the second comprehensive fault information, delete the second comprehensive fault information.

Optionally, in an embodiment, the receiving unit is further configured to receive request information sent by the VIM, where the request information is used to request, from the VNFM entity 1200, fault information of a VNF entity correlated with a faulty NFVI entity, and the sending unit is further configured to send the fault information of the VNF entity correlated with the faulty NFVI entity to the VIM.

The VNFM entity 1200 provided in this embodiment of the present application acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 13:
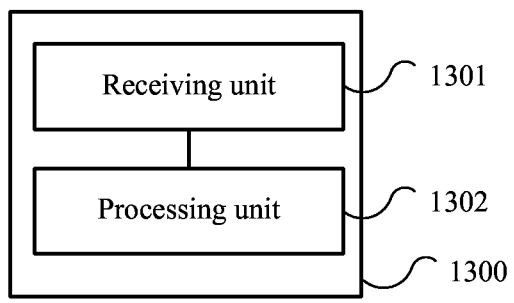
FIG. 13 is a schematic block diagram of an orchestrator (Orchestrator) entity according to an embodiment of the present application.

FIG. 13 is a schematic block diagram of an orchestrator (Orchestrator) entity according to an embodiment of the present application. The Orchestrator entity 1300 shown in FIG. 12 includes a receiving unit 1301 and a processing unit 1302.

The receiving unit 1301 receives first comprehensive fault information sent by a virtualized infrastructure manager (VIM), where the first comprehensive fault information includes first fault information, the first fault information includes a faulty entity identifier and a fault type, and the first fault information is used to indicate that a fault occurs in a first network functions virtualization infrastructure NFVI entity having the faulty entity identifier; and the processing unit 1302 performs fault repair or reporting processing according to the first comprehensive fault information. Alternatively, the receiving unit 1301 receives second comprehensive fault information sent by a virtualized network function manager (VNFM), where the second comprehensive fault information includes second fault information, the second fault information includes a faulty entity identifier and a fault type, and the second fault information is used to indicate that a fault occurs in a first virtualized network function (VNF) entity having the faulty entity identifier; and the processing unit 1302 performs fault repair or reporting processing according to the second comprehensive fault information.

The Orchestrator entity 1300 provided in this embodiment of the present application acquires fault information of a hardware and/or software entity from the VNFM or VIM, to perform comprehensive processing on correlated pieces of fault information, which can implement fault reporting and processing in an NFV environment.

Optionally, in an embodiment, the first comprehensive fault information further includes fault information of an NFVI entity correlated with the first NFVI entity, and/or fault information of a virtualized network function (VNF) entity correlated with the first NFVI entity.

Optionally, in an embodiment, the second comprehensive fault information further includes fault information of a VNF entity correlated with the first VNF entity, and/or fault information of a virtualized infrastructure manager (NFVI) entity correlated with the first VNF entity.

Optionally, in an embodiment, the processing unit 1302 is specifically configured to determine, according to the fault type in the first comprehensive fault information, whether the Orchestrator entity 1300 includes a fault repair policy corresponding to the fault type; and when the orchestrator entity 1300 includes the fault repair policy corresponding to the fault type, repair the fault of the first NFVI entity and/or a fault of the NFVI entity correlated with the first NFVI entity; or when the orchestrator entity 1300 does not include the fault repair policy corresponding to the fault type, send the first comprehensive fault information to an operation and business support system (OSS/BSS).

Optionally, in an embodiment, the processing unit 1302 is specifically configured to determine, according to the fault type in the second comprehensive fault information, whether the orchestrator entity 1300 includes a fault repair policy corresponding to the fault type; and when the orchestrator entity 1300 includes the fault repair policy corresponding to the fault type, repair a fault of the first VNF entity and/or a fault of the VNF entity correlated with the first VNF entity; or when the orchestrator entity 1300 does not include the fault repair policy corresponding to the fault type, send the second comprehensive fault information to an operation and business support system OSS/BSS.

Optionally, in an embodiment, the processing unit 1302 is specifically configured to determine, according to the fault type in the first comprehensive fault information, whether the Orchestrator entity 1300 includes a fault repair policy corresponding to the fault type; and when the Orchestrator entity 1300 includes the fault repair policy corresponding to the fault type, repair the fault of the first NFVI entity, a fault of the NFVI entity correlated with the first NFVI entity, and a fault of the VNF entity correlated with the first NFVI entity; or when the Orchestrator entity 1300 does not include the fault repair policy corresponding to the fault type, send the first comprehensive fault information to an OSS/BSS.

Optionally, in an embodiment, the processing unit 1302 is specifically configured to determine, according to the fault type in the second comprehensive fault information, whether the Orchestrator entity 1300 includes a fault repair policy corresponding to the fault type; and when the Orchestrator entity 1300 includes the fault repair policy corresponding to the fault type, repair the fault of the first VNF entity, a fault of the VNF entity correlated with the first VNF entity, and a fault of the NFVI entity correlated with the first VNF entity; or when the Orchestrator entity 1300 does not include the fault repair policy corresponding to the fault type, send the second comprehensive fault information to an OSS/BSS.

Optionally, in an embodiment, the Orchestrator entity 1300 further includes a detection unit and a deletion unit, where the detection unit is configured to detect, according to the first/second comprehensive fault information, whether the Orchestrator entity 1300 includes comprehensive fault information that is the same as the first/second comprehensive fault information, and the deletion unit is configured to: when the Orchestrator entity 1300 includes the comprehensive fault information that is the same as the first/second comprehensive fault information, delete the first/second comprehensive fault information.

The Orchestrator entity 1300 provided in this embodiment of the present application acquires fault information of a hardware and/or software entity from the VIM or VNFM, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 14:
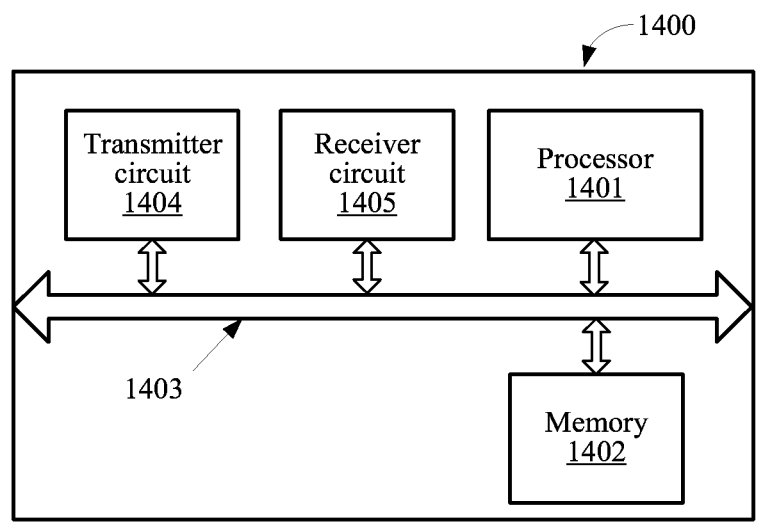
FIG. 14 is a schematic block diagram of a VIM entity according to another embodiment of the present application.

FIG. 14 is a schematic block diagram of a VIM entity according to another embodiment of the present application. The VIM entity 1400 in FIG. 14 includes a processor 1401 and a memory 1402. The processor 1401 is connected to the memory 1402 by using a bus system 1403.

The memory 1402 is configured to store an instruction enabling the processor 1401 to execute the following operations: acquiring first fault information, including a faulty entity identifier and a fault type, of an NFVI entity, where the first fault information is used to indicate that a fault occurs in a first NFVI entity having the faulty entity identifier; generating first comprehensive fault information according to the first fault information, where the first comprehensive fault information includes the first fault information and correlated fault information of the first fault information; and performing fault repair or reporting processing according to the first comprehensive fault information.

The VIM entity 1400 provided in this embodiment of the present application acquires fault information of a hardware and/or software entity, to perform comprehensive processing on correlated pieces of fault information, which can implement fault reporting and processing in an NFV environment.

In addition, the VIM entity 1400 may further include a transmitter circuit 1404 and a receiver circuit 1405. The processor 1401 controls an operation of the VIM entity 1400, and the processor 1401 may also be referred to as a central processing unit (CPU). The memory 1402 may include a read-only memory and a random access memory, and provides an instruction and data to the processor 1401. A part of the memory 1402 may further include a non-volatile random access memory (NVRAM). Components of the VIM entity 1400 are coupled together by using the bus system 1403, where in addition to a data bus, the bus system 1403 includes a power bus, a control bus, and a state signal bus. However, for clear description, various types of buses in the figure are marked as the bus system 1403.

The method disclosed in the embodiments of the present application may be applied to the processor 1401, or implemented by the processor 1401. The processor 1401 may be an integrated circuit chip and has a signal processing capability. In the implementation process, steps of the foregoing method may be implemented by using an integrated logical circuit in hardware of the processor 1401 or an instruction in a software form. The foregoing processor 1401 may be a general purpose processor, a digital signal processor (DSP), an application-specific integrated circuit (ASIC), a field programmable gate array (FPGA), or another programmable logical device, discrete gate or transistor logical device, or discrete hardware component. The processor 1401 may implement or execute methods, steps and logical block diagrams disclosed in the embodiments of the present application. A general purpose processor may be a microprocessor or the processor may be any conventional processor and the like. Steps of the methods disclosed with reference to the embodiments of the present application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1402, and the processor 1401 reads information in the memory 1402 and completes the steps in the foregoing methods in combination with hardware of the processor.

The VIM entity 1400 provided in this embodiment of the present application acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 15:
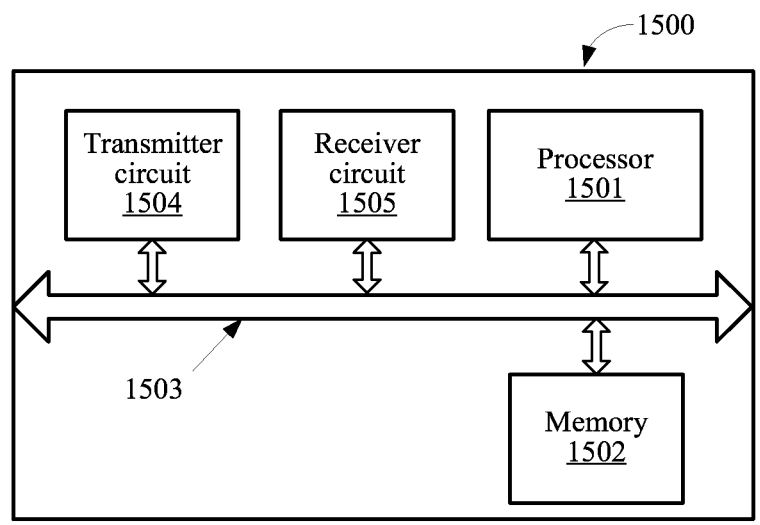
FIG. 15 is a schematic block diagram of a VNFM entity according to another embodiment of the present application.

FIG. 15 is a schematic block diagram of a VNFM entity according to another embodiment of the present application. The VNFM entity 1500 in FIG. 15 includes a processor 1501 and a memory 1502. The processor 1501 is connected to the memory 1502 by using a bus system 1503.

The memory 1502 is configured to store an instruction enabling the processor 1501 to execute the following operations: acquiring second fault information, including a faulty entity identifier and a fault type, of a virtualized network functions VNF entity, where the second fault information is used to indicate that a fault occurs in a first VNF entity having the faulty entity identifier; generating second comprehensive fault information according to the second fault information; and performing fault repair or reporting processing according to the second comprehensive fault information.

The VNFM entity 1500 provided in this embodiment of the present application acquires fault information of a hardware and/or software entity, to perform comprehensive processing on correlated pieces of fault information, which can implement fault reporting and processing in an NFV environment.

In addition, the VNFM entity 1500 may further include a transmitter circuit 1504 and a receiver circuit 1505. The processor 1501 controls an operation of the VNFM entity 1500, and the processor 1501 may also be referred to as a central processing unit (CPU). The memory 1502 may include a read-only memory and a random access memory, and provides an instruction and data to the processor 1501. A part of the memory 1502 may further include a non-volatile random access memory (NVRAM). Components of the VNFM entity 1500 are coupled together by using the bus system 1503, where in addition to a data bus, the bus system 1503 includes a power bus, a control bus, and a state signal bus. However, for clear description, various types of buses in the figure are marked as the bus system 1503.

The method disclosed in the embodiments of the present application may be applied to the processor 1501, or implemented by the processor 1501. The processor 1501 may be an integrated circuit chip and has a signal processing capability. In the implementation process, steps of the foregoing method may be implemented by using an integrated logical circuit in hardware of the processor 1501 or an instruction in a software form. The foregoing processor 1501 may be a general purpose processor, a digital signal processor (DSP), an application-specific integrated circuit (ASIC), a field programmable gate array (FPGA), or another programmable logical device, discrete gate or transistor logical device, or discrete hardware component. The processor 802 may implement or execute methods, steps and logical block diagrams disclosed in the embodiments of the present application. A general purpose processor may be a microprocessor or the processor may be any conventional processor and the like. Steps of the methods disclosed with reference to the embodiments of the present application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1502, and the processor 1501 reads information in the memory 1502 and completes the steps in the foregoing methods in combination with hardware of the processor.

The VNFM entity 1500 provided in this embodiment of the present application acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

Figure 16:
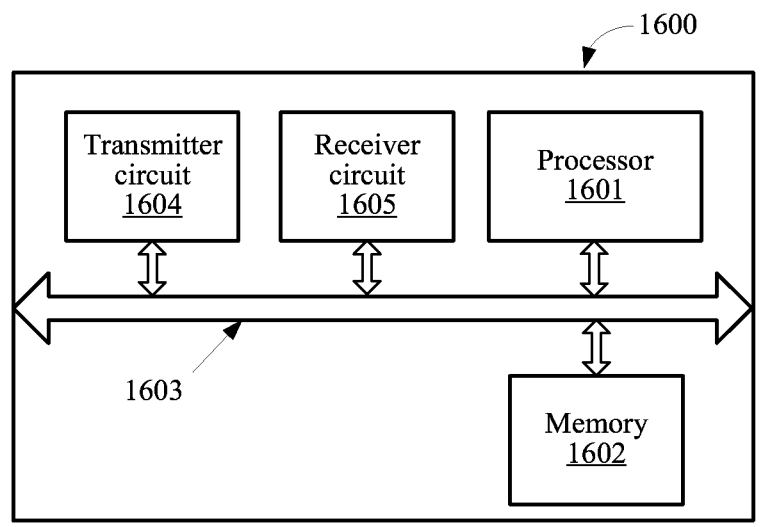
FIG. 16 is a schematic block diagram of an Orchestrator entity according to another embodiment of the present application.

FIG. 16 is a schematic block diagram of an Orchestrator entity according to another embodiment of the present application. The Orchestrator entity 1600 in FIG. 16 includes a processor 1601 and a memory 1602. The processor 1601 is connected to the memory 1602 by using a bus system 1603.

The memory 1602 is configured to store an instruction enabling the processor 1601 to execute the following operations: receiving first comprehensive fault information sent by a virtualized infrastructure manager (VIM), where the first comprehensive fault information includes first fault information, the first fault information includes a faulty entity identifier and a fault type, and the first fault information is used to indicate that a fault occurs in a first network functions virtualization infrastructure (NFVI) entity having the faulty entity identifier; and performing fault repair or reporting processing according to the first comprehensive fault information; or receiving second comprehensive fault information sent by a virtualized network function manager (VNFM), where the second comprehensive fault information includes second fault information, the second fault information includes a faulty entity identifier and a fault type, and the second fault information is used to indicate that a fault occurs in a first virtualized network function (VNF) entity having the faulty entity identifier; and performing fault repair or reporting processing according to the second comprehensive fault information.

The Orchestrator entity 1600 provided in this embodiment of the present application acquires fault information of a hardware and/or software entity, to perform comprehensive processing on correlated pieces of fault information, which can implement fault reporting and processing in an NFV environment.

In addition, the Orchestrator entity 1600 may further include a transmitter circuit 1604 and a receiver circuit 1605. The processor 1601 controls an operation of the Orchestrator entity 1600, and the processor 1601 may also be referred to as a central processing unit (CPU). The memory 1602 may include a read-only memory and a random access memory, and provides an instruction and data to the processor 1601. A part of the memory 1602 may further include a non-volatile random access memory (NVRAM). Components of the Orchestrator entity 1600 are coupled together by using the bus system 1603, where in addition to a data bus, the bus system 1603 includes a power bus, a control bus, and a state signal bus. However, for clear description, various types of buses in the figure are marked as the bus system 1603.

The method disclosed in the embodiments of the present application may be applied to the processor 1601, or implemented by the processor 1601. The processor 1601 may be an integrated circuit chip and has a signal processing capability. In the implementation process, steps of the foregoing method may be implemented by using an integrated logical circuit in hardware of the processor 1601 or an instruction in a software form. The foregoing processor 1601 may be a general purpose processor, a digital signal processor (DSP), an application-specific integrated circuit (ASIC), a field programmable gate array (FPGA), or another programmable logical device, discrete gate or transistor logical device, or discrete hardware component. The processor 1601 may implement or execute methods, steps and logical block diagrams disclosed in the embodiments of the present application. A general purpose processor may be a microprocessor or the processor may be any conventional processor and the like. Steps of the methods disclosed with reference to the embodiments of the present application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1602, and the processor 1601 reads information in the memory 1602 and completes the steps in the foregoing methods in combination with hardware of the processor.

The Orchestrator entity 1600 provided in this embodiment of the present application acquires fault information of a hardware and/or software entity, to perform comprehensive processing on correlated pieces of fault information, which can implement fault reporting and processing in an NFV environment. In addition, because comprehensive processing is performed on correlated pieces of fault information, and same comprehensive fault information is deleted by means of repeated-alarm detection, the fault processing efficiency and accuracy are improved.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present application.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present application is described in detail with reference to the accompany drawings and in combination with the exemplary embodiments, but the present application is not limited thereto. Various equivalent modifications or replacements can be made to the embodiments of the present application by a person of ordinary skill in the art without departing from the spirit and essence of the present application, and the modifications or replacements shall fall within the scope of the present application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving second fault information, by a virtualized network function manager (VNFM) from a first virtualized network function (VNF) entity, the second fault information comprising a faulty entity identifier of the first VNF entity and a fault type of the first VNF entity, wherein the second fault information indicates that a first fault has occurred in the first VNF entity, and the second fault information further comprises a second running state and a second fault time;
   generating, by the VNFM, second comprehensive fault information, wherein the second comprehensive fault information is generated according to the second fault information and second correlated fault information of the second fault information, wherein the second correlated fault information is fault information from a second VNF entity correlated with the first VNF entity, the second comprehensive fault information comprises second fault state information, and a second fault state comprised in the second fault state information comprises at least one of repaired and not repaired yet;
   sending, by the VNFM, the second comprehensive fault information;
   receiving, by the VNFM, first comprehensive fault information from a virtualized infrastructure manager (VIM), wherein the first comprehensive fault information comprises first fault information and first correlated fault information of the first fault information, and the first fault information indicates that a second fault has occurred in a first network functions virtualization infrastructure (NFVI) entity;
   determining, by the VNFM, whether the VNFM comprises a fault repair policy that corresponds to a fault type in the first fault information or a fault type in the first correlated fault information; and
   in response to the VNFM determining the VNFM does comprise any fault repair policy that corresponds to the fault type in the first fault information or the fault type in the first correlated fault information, sending, by the VNFM, the first comprehensive fault information to an orchestrator, or sending an indication message indicating that the VNFM is incapable of processing the first comprehensive fault information to the VIM.

2. The method according to claim 1, wherein
   the second comprehensive fault information further comprises the second fault information and the second correlated fault information.

3. The method according to claim 1, wherein sending the second comprehensive fault information comprises:
   determining, by the VNFM, according to the fault type in the second fault information, or a fault type in the second correlated fault information, whether the VNFM comprises a fault repair policy that corresponds to the fault type in the second fault information or the fault type in the second correlated fault information, wherein the second fault information and the second correlated fault information are comprised in the second comprehensive fault information; and
   in response to determining that the VNFM does not comprise the fault repair policy that corresponds to the fault type in the second fault information or the fault type in the second correlated fault information, sending, by the VNFM, the second comprehensive fault information to the orchestrator.

4. The method according to claim 1, wherein:
   the first fault information further comprises at least one of a first running state and a first fault time; and
   the first comprehensive fault information further comprises first fault state information, the first fault state information comprises a first fault state, and the first fault state comprises at least one of repaired and not repaired yet.

5. The method according to claim 1, wherein after sending the second comprehensive fault information, the method further comprises:
   detecting, by the VNFM according to the second comprehensive fault information, whether the VNFM comprises comprehensive fault information that is the same as the second comprehensive fault information; and
   in response to the VNFM comprising the comprehensive fault information that is the same as the second comprehensive fault information, deleting, by the VNFM, the second comprehensive fault information.

6. A virtualized network function manager (VNFM), comprising:
   a processor and a memory coupled to the processor, wherein the processor is configured to:
   receive second fault information from a first virtualized network function (VNF) entity, the second fault information comprising a faulty entity identifier and a fault type of the first VNF entity, wherein the second fault information indicates that a second fault has occurred in the first VNF entity, and the second fault information further comprises a second running state and a second fault time;
   generate second comprehensive fault information according to the second fault information and second correlated fault information of the second fault information, wherein the second correlated fault information is fault information from a second VNF entity correlated with the first VNF entity, the second comprehensive fault information comprises second fault state information, the second fault state information comprises a second fault state, and the second fault state comprises at least one of repaired and not repaired yet;
   send the second comprehensive fault information;
   receive first comprehensive fault information from a virtualized infrastructure manager (VIM), wherein the first comprehensive fault information comprises first fault information and first correlated fault information of the first fault information, and the first fault information indicates that a first fault has occurred in a first network functions virtualization infrastructure (NFVI) entity;

determine whether the VNFM comprises a fault repair policy that corresponds to a fault type in the first fault information or a fault type in the first correlated fault information; and in response to the VNFM not comprising any fault repair policy that corresponds to the fault type in the first fault information or the fault type in the first correlated fault information, send the first comprehensive fault information to an orchestrator, or send an indication message indicating that the VNFM is incapable of processing the first comprehensive fault information to the VIM.

7. The VNFM according to claim 6, wherein the second comprehensive fault information further comprises the second fault information and the second correlated fault information.

8. The VNFM according to claim 6, wherein the processor is further configured to:

determine, according to the fault type in the second fault information, or a fault type in the second correlated fault information, whether the VNFM comprises a fault repair policy that corresponds to the fault type in the second fault information or the fault type in the second correlated fault information, wherein the second fault information and the second correlated fault information are comprised in the second comprehensive fault information; and in response to the VNFM not comprising the fault repair policy that corresponds to the fault type in the second fault information or the fault type in the second correlated fault information, send the second comprehensive fault information to the orchestrator.

9. The VNFM according to claim 6, wherein:

the first fault information further comprises at least one of a first running state and a first fault time; and the first comprehensive fault information further comprises first fault state information, the first fault state information comprises a first fault state, and the first fault state comprises at least one of repaired and not repaired yet.

10. The VNFM according to claim 6, wherein the processor is further configured to:

detect, according to the second comprehensive fault information, whether the VNFM comprises comprehensive fault information that is the same as the second comprehensive fault information; and in response to the VNFM comprising the comprehensive fault information that is the same as the second comprehensive fault information, delete the second comprehensive fault information.

11. A non-transitory computer-readable storage medium having a program recorded thereon; wherein the program makes a computer perform the following:

receiving second fault information from a first virtualized network function (VNF) entity, the second fault information comprising a faulty entity identifier and a fault type of the first VNF entity, wherein the second fault information indicates that a fault has occurred in the first VNF entity, and the second fault information further comprises a second running state and a fault time;

generating second comprehensive fault information according to the second fault information and second correlated fault information of the second fault information, wherein the second correlated fault information is fault information from a second VNF entity correlated with the first VNF entity, the second comprehensive fault information comprises second fault state information, the second fault state information comprises a second fault state, and the second fault state comprises at least one of repaired and not repaired yet;

sending the second comprehensive fault information;

receiving first comprehensive fault information from a virtualized infrastructure manager (VIM), wherein the first comprehensive fault information comprises first fault information and first correlated fault information of the first fault information, and the first fault information indicates that a fault has occurred in a first network functions virtualization infrastructure (NFVI) entity;

determining whether the computer comprises a fault repair policy that corresponds to a fault type in the first fault information or a fault type in the first correlated fault information; and in response to the computer not comprising the fault repair policy that corresponds to the fault type in the first fault information or the fault type in the first correlated fault information, sending the first comprehensive fault information to an orchestrator, or sending an indication message indicating that the computer is incapable of processing the first comprehensive fault information to the VIM.

12. The non-transitory computer-readable storage medium according to claim 11, wherein the second comprehensive fault information further comprises the second fault information and the second correlated fault information.

* * * * *